(12) United States Patent
Tarumi et al.

(10) Patent No.: US 6,716,491 B2
(45) Date of Patent: Apr. 6, 2004

(54) LIQUID-CRYSTALLINE MEDIUM

(75) Inventors: Kazuaki Tarumi, Seeheim (DE); Brigitte Schuler, Grossostheim (DE); Matthias Bremer, Darmstadt (DE); Ulrich Finkenzeller, Plankstadt (DE); Eike Poetsch, Mühltal (DE); Heike Kniel, Heppenheim (DE)

(73) Assignee: Merck Patent GmbH, Darmstadt (DE)

( * ) Notice: Subject to any disclaimer, the term of this patent is extended or adjusted under 35 U.S.C. 154(b) by 64 days.

(21) Appl. No.: 09/850,408

(22) Filed: May 8, 2001

(65) Prior Publication Data
US 2002/0030180 A1 Mar. 14, 2002

(30) Foreign Application Priority Data
May 8, 2000 (EP) ............................................. 00109161

(51) Int. Cl.[7] ..................... C09K 19/34; C09K 19/30; C07D 319/06; C07D 25/24; C07C 25/13
(52) U.S. Cl. ............. 428/1.1; 252/299.61; 252/299.63; 252/299.67; 549/371; 549/374; 570/129; 570/183
(58) Field of Search ....................... 252/299.61, 299.63, 252/299.67; 428/1.1; 549/371, 374; 570/129, 183

(56) References Cited

U.S. PATENT DOCUMENTS 4,970,022 A * 11/1990 Scheuble et al. ...... 252/299.61

FOREIGN PATENT DOCUMENTS

| DE | 40 27 869 |   | 3/1991 |
| JP | 60-136555 | * | 7/1985 |
| JP | 2-29489 | * | 1/1990 |
| JP | 2-29490 | * | 1/1990 |
| JP | 6-108054 | * | 4/1994 |

OTHER PUBLICATIONS

Derwent English Abstract of DE 4027869, 1991.*
English translation by computer for JP 06–108054, http://www6.ipdl.jpo.go.jp/Tokujitu/PAJdetail.ipdl?N0000=60&N0120=01&N2001=2&N3001=H06-108054.*
Derwent abstract of JP 2–29489, 1990.*
Derwent abstract of JP 2–29490, 1990.*
English abstract of JP 60–136555.*
English abstract of JP 2–29489.*
English abstract of JP 2–29490.*
Derwent abstract of JP 60–136555, 1988.*

* cited by examiner

Primary Examiner—Shean C. Wu
(74) Attorney, Agent, or Firm—Millen, White, Zelano & Branigan, P.C.

(57) ABSTRACT

A liquid-crystalline medium based on a mixture of polar compounds of positive dielectric anisotropy, which comprises one or more compounds of the formula I

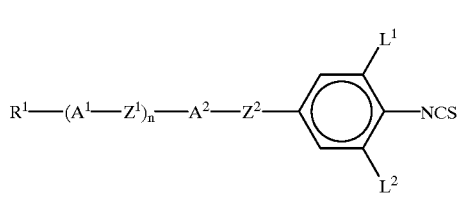

where $R^1$, $A^1$, $A^2$, $Z^1$, $Z^2$, $L^1$, $L^2$ and n are as defined herein, is suitable for use in, for example, MLC, TN and STN displays.

31 Claims, No Drawings

LIQUID-CRYSTALLINE MEDIUM

The present invention relates to a liquid-crystalline medium, to the use thereof for electro-optical purposes, and to displays containing this medium, and to novel compounds for use in the liquid-crystalline medium according to the invention.

Liquid-crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Non-linear elements which can be used for individual switching of the individual pixels are, for example, active elements (i.e. transistors). The term "active matrix" is then used, where a distinction can be made between two types:

1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarizers in transmission and are illuminated from the back.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallization and/or smectic phases occur, even at low temperatures, and the temperature dependence of the viscosity is as low as possible. The MLC displays from the prior art thus do not meet today's requirements.

There thus continues to be a great demand for MLC displays having very high specific resistance at the same time as a large working-temperature range, short response times even at low temperatures and low threshold voltage which do not have these disadvantages, or only do so to a reduced extent.

In TN (Schadt-Helfrich) cells, media are desired which facilitate the following advantages in the cells:
  extended nematic phase range (in particular down to low temperatures)
  the ability to switch at extremely low temperatures (outdoor use, automobile, avionics)
  increased resistance to UV radiation (longer life)

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

SUMMARY OF INVENTION

An object of the invention is to provide media, in particular for MLC, TN or STN displays of this type, which do not have the above-mentioned disadvantages or only do so to a reduced extent, and preferably simultaneously have very high specific resistances and low threshold voltages.

For some applications, it is particularly desirable to further reduce the viscosity at low temperatures. Still faster response times will thereby be achieved.

Upon further study of the specification and appended claims, further objects and advantages of this invention will become apparent to those skilled in the art.

It has now been found that these objects can be achieved if media according to the invention are used in displays.

The invention thus relates to a liquid-crystalline medium based on a mixture of polar compounds of positive dielectric anisotropy, characterized in that it comprises one or more compounds of the formula I

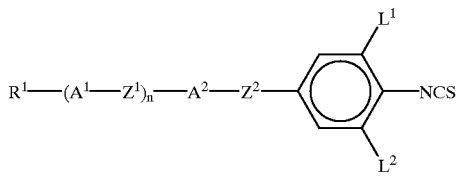

in which $R^1$ is alkyl having 1 to 2 carbon atoms, alkoxy having 1 to 2 carbon atoms or alkenyl group having 2 to 12 carbon atoms, in which, in addition, in each case, one or two non-adjacent $CH_2$ groups may each be replaced by —O—, —CH=CH—, —CO—, —OCO— or —COO— in such a way that O atoms are not linked directly to one another, $Z^1$ and $Z^2$ are each, independently of one another, —O—, —COO—, —OCO—, —$CH_2CH_2$—, —CH=CH—, —$CF_2CF_2$—, $CF_2O$—, —$OCF_2$—, —$CH_2O$—, —$OCH_2$—, —CF=CF— or a single bond, $A^1$ and $A^2$ are each, independently of one another,

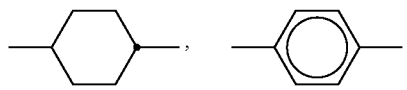

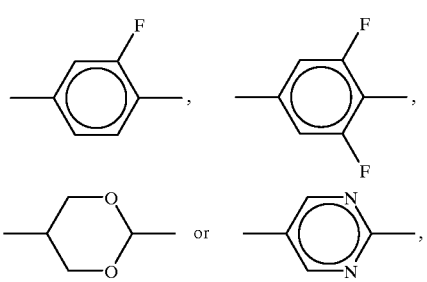

$A^2$, if n is 1, can also be,

n is 0 or 1, and $L^1$ and $L^2$ are each, independently of one another, H or F.

Particular preference is given to compounds of the formula I in which $L^1$ or $L^2$, particularly preferably $L^1$ and $L^2$, are F.

Particular preference is given to compounds of the formula I1

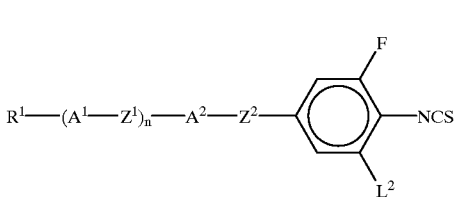

in which $R^1$, $Z^1$, $Z^2$, n and $L^2$ are as defined in the formula I,

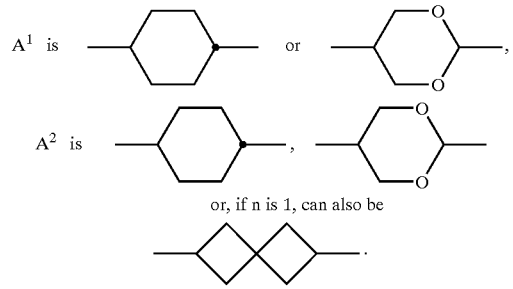

Preference is furthermore given to compounds of the formula I2

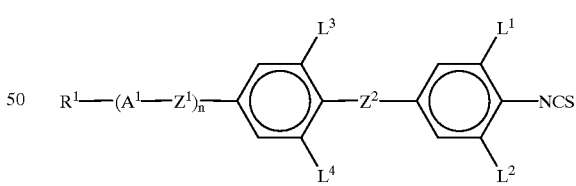

in which $R^1$, $A^1$, $Z^1$, $Z^2$, n, $L^1$ and $L^2$ are as defined in the formula I, and $L^3$ and $L^4$ are each, independently of one another, H or F.

Particular preference is given to compounds of the formula I2 in which at least one of $L^1$, $L^2$, $L^3$ and $L^4$, particularly preferably both $L^1$ and $L^2$ and/or both $L^3$ and $L^4$, are F.

The compounds of the formula I1 are preferably selected from the group consisting of I1a to I1n

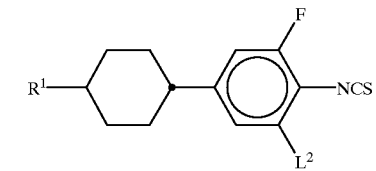
I1a
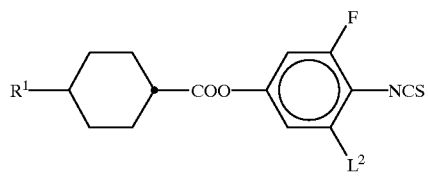
I1b
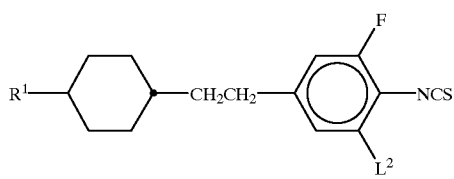
I1c
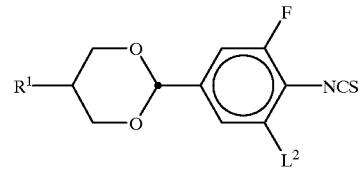
I1d
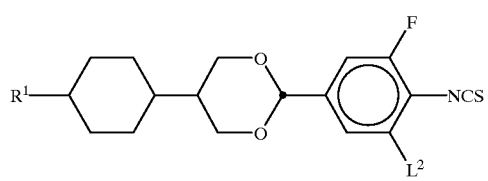
I1e
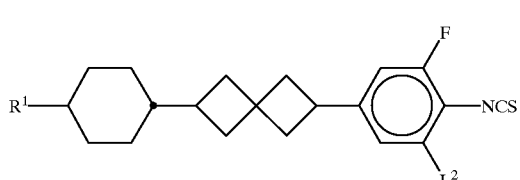
I1f
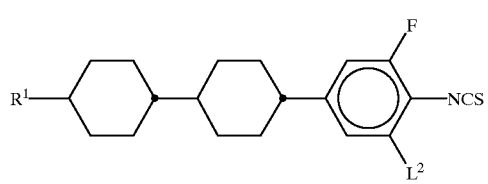
I1g
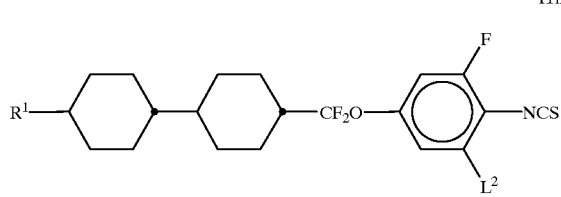
I1h
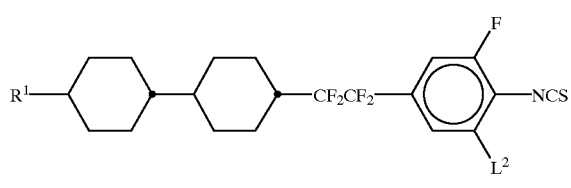
I1i
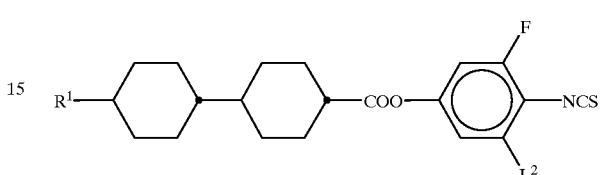
I1k
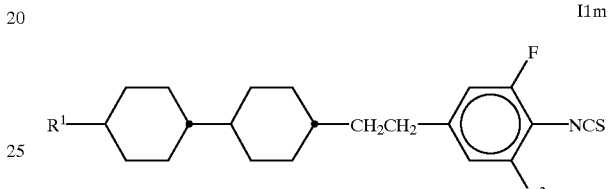
I1m
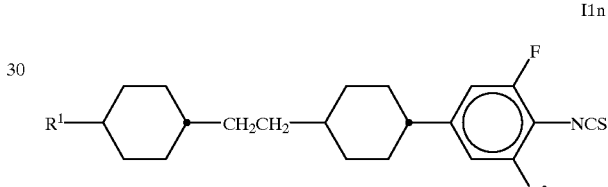
I1n
in which $R^1$ is as defined in the formula I, and $L^2$ is H or F.
Particular preference is given to compounds of the formulae I1a, I1c, I1d, I1e, I1g, I1h, I1i and I1m, in particular those of the formulae I1a, I1d and I1g.
The compounds of the formula I2 are preferably selected from the group consisting of I2a to I2n
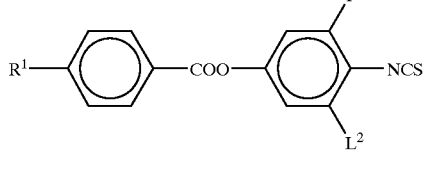
I2a
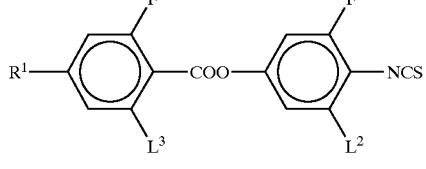
I2b
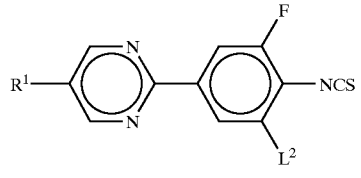
I2c I2d

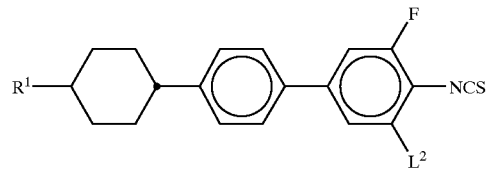

I2e

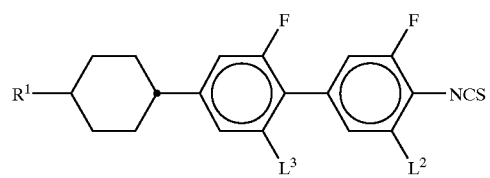

I2f

I2g

I2h

I2i

I2k

I2m

I2n

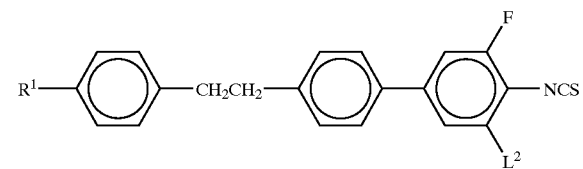

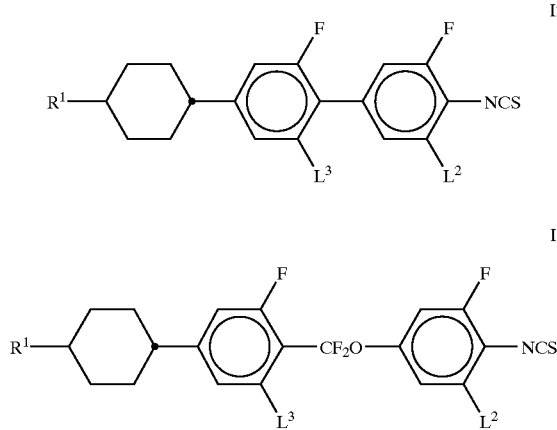

in which $R^1$ is as defined in the formula I, and $L^2$, $L^3$ and $L^4$ are each, independently of one another, H or F.

Particular preference is given to compounds of the formulae I2a, I2b, I2d, I2e, I2f and I2g.

Particular preference is given to compounds of the formulae I1 and I2 and their sub-formulae in which $L^1$ and $L^2$ and/or $L^3$ and $L^4$ are F.

Preference is furthermore given to compounds of the formulae I, I1, I2 and their sub-formulae in which $R^1$ is alkyl or alkoxy, in particular alkyl, having 1 to 7 carbon atoms.

The compounds of the formula I have a broad range of applications. These compounds can serve as base materials of which liquid-crystalline media are predominantly composed; however, it is also possible to add compounds of the formula I to liquid-crystalline base materials from other classes of compound in order, for example, to modify the dielectric and/or optical anisotropy of a dielectric of this type and/or to optimize its threshold voltage and/or its viscosity.

In the pure state, the compounds of the formula I are colourless and form liquid-crystalline mesophases in a temperature range which is favourably located for electro-optical use. They are stable chemically, thermally and to light. The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the reactions. Use can also be made here of variants which are known per se, but are not mentioned here in greater detail.

Some compounds of the formula I in which $L^1$ and $L^2$ are F and their preparation are disclosed in DE 40 27 869. The other compounds of the formula I can be prepared analogously to the processes described in DE 40 27 869.

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which contain media of this type, and to the use of these media for electro-optical purposes.

The liquid-crystal mixtures according to the invention enable a significant widening of the available parameter latitude. Thus, the achievable combinations of clearing point, viscosity at low temperature, thermal and UV stability and dielectric anisotropy are far superior to previous materials from the prior art.

The requirement for a high clearing point, a nematic phase at low temperature, high Δε and at the same time low viscosity has hitherto only been achieved to an inadequate extent. Although mixtures disclosed hitherto have comparably high values for the clearing point and for Δε as well as favourable birefringence, they still, however, have inadequately low values for the rotational viscosity $y_1$.

Other mixture systems have comparable viscosities and $\Delta\epsilon$ values, but have only clearing points in the region of 60° C.

The liquid-crystal mixtures according to the invention, while retaining the nematic phase down to −20° C. and preferably down to −30° C., particularly preferably down to −40° C., enable clearing points above 80°, preferably above 85°, particularly preferably above 90° C., simultaneously dielectric anisotropy values $\Delta\epsilon$ of $\geq 5$, preferably $\geq 7$, and a high value for the specific resistance to be achieved, enabling excellent STN and MLC displays to be obtained. In particular, the mixtures are characterized by small operating voltages. The TN thresholds are below 2.0 V, preferably below 1.8 V, particularly preferably <1.6 V.

It goes without saying that, through a suitable choice of the components of the mixtures according to the invention, it is also possible for higher clearing points (for example above 110°) to be achieved at a higher threshold voltage or lower clearing points to be achieved at lower threshold voltages with retention of the other advantageous properties. At viscosities correspondingly increased only slightly, it is likewise possible to obtain mixtures having greater $\Delta\epsilon$ and thus lower thresholds. The MLC displays according to the invention preferably operate at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584, 1975], where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistances to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The rotational viscosity $\gamma_1$ at 20° C. is preferably <150 mPa.s, particularly preferably <130 mPa.s. The nematic phase range is preferably at least 90°, in particular at least 100°. This range preferably extends at least from −20° C. to +80°.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR with increasing temperature than, for example, analogous mixtures comprising cyanophenyl-cyclohexanes of the formula

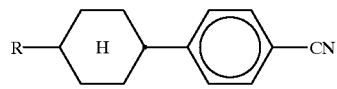

or esters of the formula

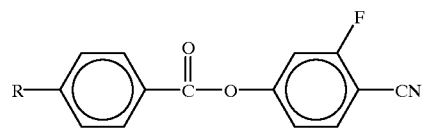

instead of the compounds of the formula I.

In addition, it has been found that mixtures according to the invention comprising compounds of the formula I have a higher clearing point and higher $\Delta\epsilon$ than analogous mixtures comprising cyanophenylcyclohexanes of the above-mentioned formula.

In particular, it has been found that liquid-crystal mixtures according to the invention which comprise compounds of the formula I have a HR which is just as good or even better and at the same time higher birefringence and a higher clearing point than analogous liquid-crystal mixtures from the prior art which comprise compounds which are homologous to the formula I in which NCS has been replaced by F. The use of compounds of the formula I thus enables the provision of liquid-crystal mixtures of higher birefringence and higher clearing point while retaining or even improving the favourable values for the HR.

The UV stability of the mixtures according to the invention is also considerably better, i.e. they exhibit a significantly smaller decrease in the HR on exposure to UV.

The media according to the invention are preferably based on a plurality (preferably two or more) of compounds of the formula I, i.e. the proportion of these compounds is 5–95%, preferably 10–60% and particularly preferably in the range 13–50%.

The individual compounds of the formulae I to XII and their sub-formulae which can be used in the media according to the invention are either known or they can be prepared analogously to the known compounds.

Preferred embodiments are indicated below:

medium additionally comprises one or more mesogenic compounds containing a 3,4,5-trifluorophenyl group medium additionally comprises one or more compounds selected from the group consisting of the formulae II to VI:

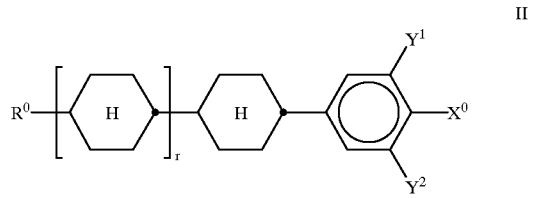

II

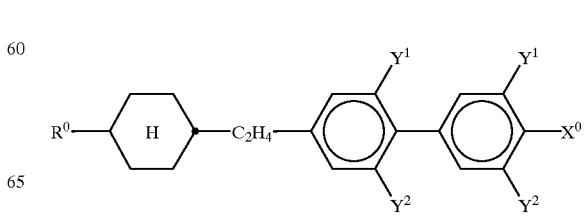

III

IV

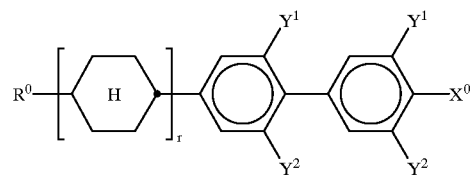

V

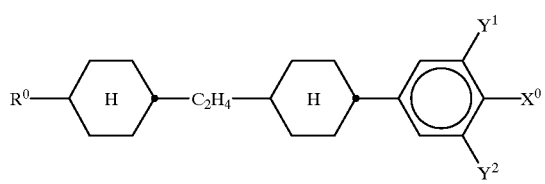

VI

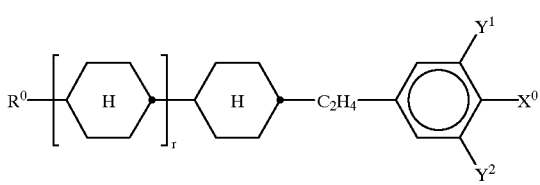

in which the individual radicals have the following meanings:

R⁰: n-alkyl, oxaalkyl, fluoroalkyl or alkenyl, each having up to 9 carbon atoms

X⁰: F, Cl, or halogenated alkyl, halogenated alkenyl or halogenated alkoxy each having up to 6 carbon atoms $Y^1$ and $Y^2$: each, independently of one another, H or F r: 0 or 1.

The compounds of the formula IV are preferably selected from the group consisting of the formulae IVa to IVe IVa

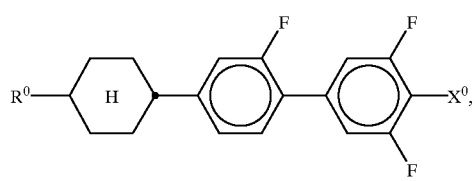

IVb

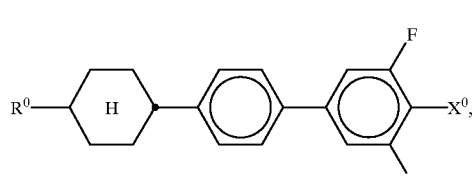

IVc

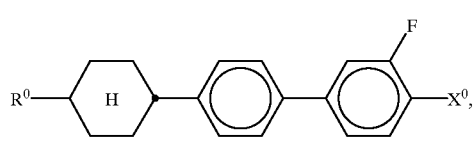

IVd

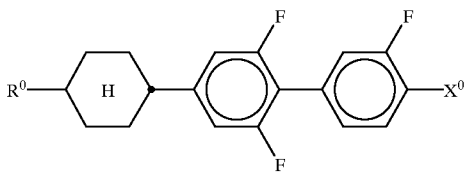

IVe

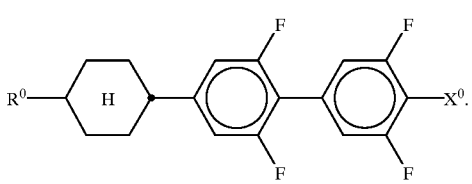

in which R⁰ and X⁰ are as defined in the formula IV, medium additionally comprises one or more compounds selected from the group consisting of the formulae VII to XII:

VII

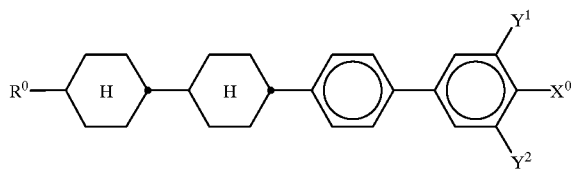

VIII

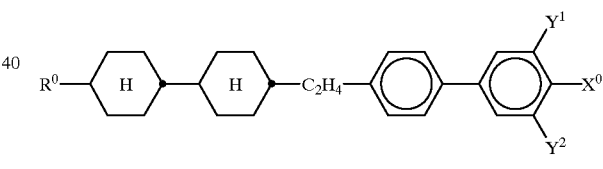

IX

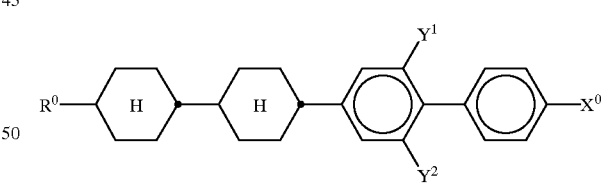

X

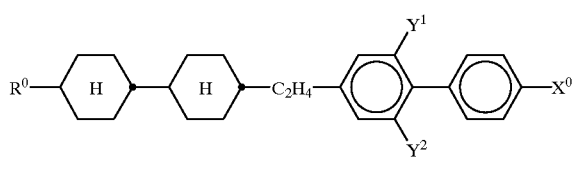

XI

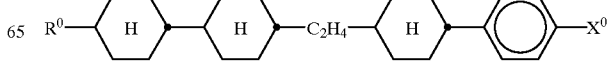

XII

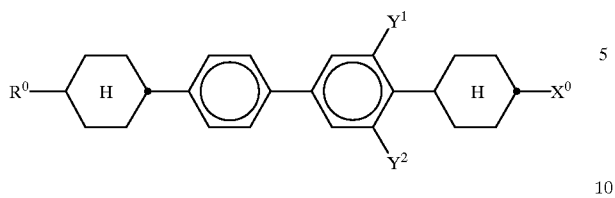

in which $R^0$, $X^0$, $Y^1$ and $Y^2$ each, independently of one another, have one of the meanings indicated in the formula II, $X^0$ is preferably F, Cl, $CF_3$, $OCF_3$ or $OCHF_2$, and $R^0$ is preferably alkyl, oxaalkyl, fluoroalkyl or alkenyl, each having up to 6 carbon atoms, medium comprises one or more compounds of the formula IIa:

IIa

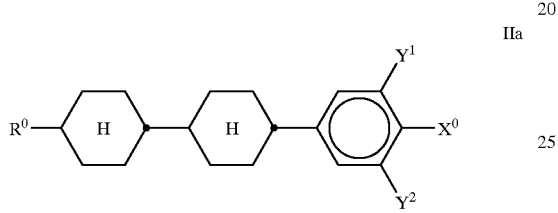

in which $R^0$, $X^0$, $Y^1$ and $Y^2$ are as defined in the formula II, medium comprises one or more compounds of the formula IIa in which $X^0$, $Y^1$ and $Y^2$ are F, medium comprises one or more compounds of the formula IIa in which $X^0$ is $OCF_3$, $Y^1$ is H or F, and $Y^2$ is H, medium comprises one or more compounds of the formula IVa, IVa

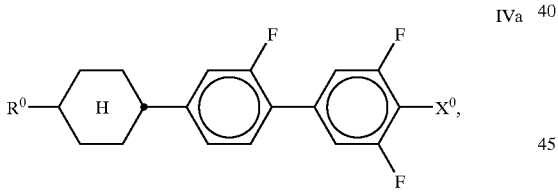

in which $R^0$ and $X^0$ are as defined in the formula IV, and $X^0$ is preferably F, medium comprises one or more compounds of the formula I1f;

medium comprises one or more compounds of the formula I1g;

the proportion of compounds of the formulae I to VI together in the mixture as a whole is at least 50% by weight;

the proportion of compounds of the formula I in the mixture as a whole is from 5 to 50% by weight, in particular from 7 to 35% by weight, very particular preferably from 9 to 25% by weight;

the proportion of compounds of the formulae II to VI in the mixture as a whole is from 20 to 90% by weight, in particular from 30 to 80% by weight, very particularly preferably from 40 to 70% by weight,

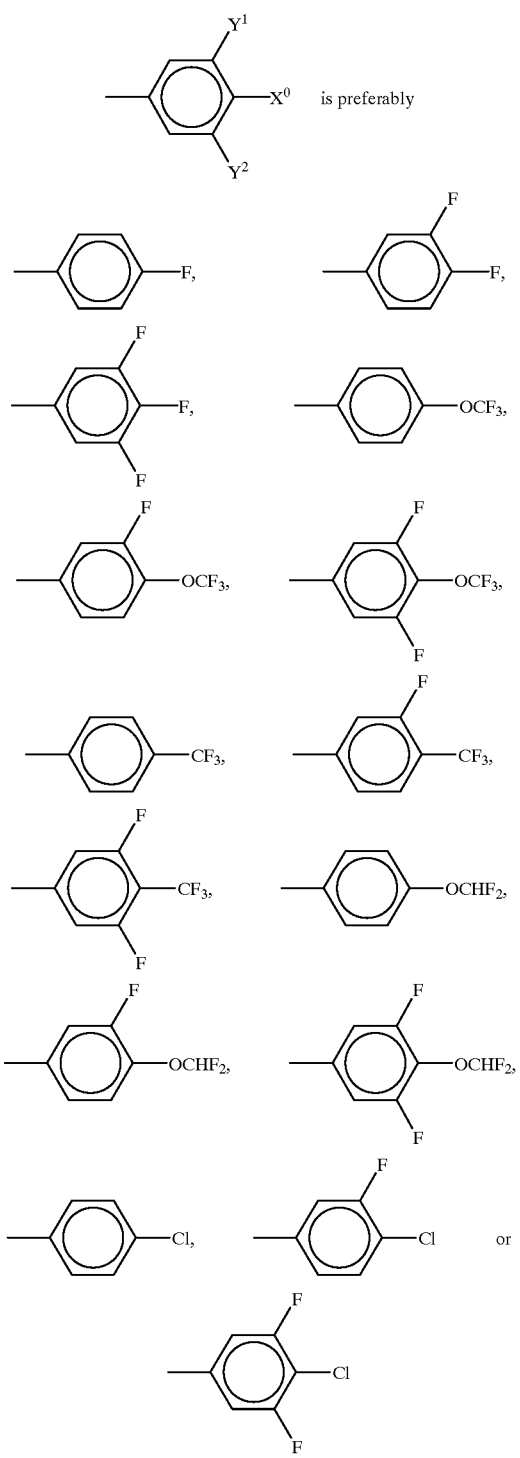

is preferably the medium comprises compounds of the formulae II, III, IV, V or VI $R^0$ is straight-chain alkyl or straight-chain alkenyl, each having 2 to 7 carbon atoms the medium essentially consists of compounds of the formulae I to VI the medium comprises further compounds, preferably selected from the following group consisting of the general formulae XIII to XVI:

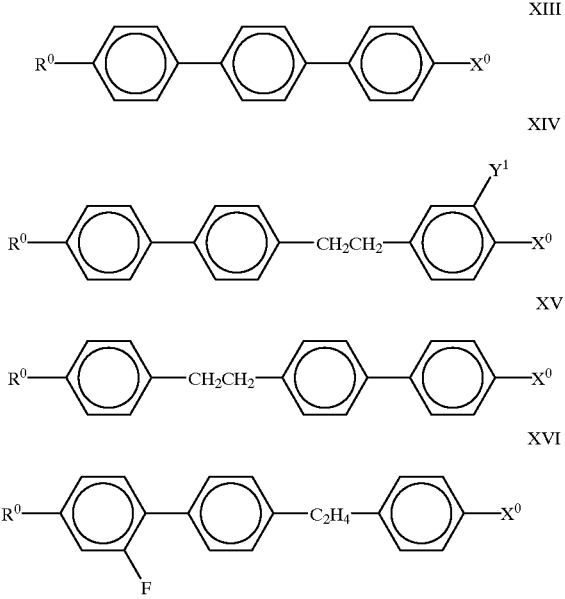

in which R⁰ and X⁰ are as defined in the formula II, and the 1,4-phenylene rings may be substituted by CN, chlorine or fluorine. In formula XVI, X⁰ is preferably F or Cl. The 1,4-phenylene rings are preferably monosubstituted or polysubstituted by fluorine atoms.

The I: (II+III+IV+V+VI) weight ratio is preferably from 1:10 to 10:1.

Medium essentially consists of compounds selected from the group consisting of the general formulae I to XII.

It has been found that even a relatively small proportion of compounds of the formula I mixed with conventional liquid-crystal materials, but in particular with one or more compounds of the formulae II, III, IV, V and/or VI, results in a significant lowering of the threshold voltage and high clearing points, with broad nematic phases with low smectic-nematic transition temperatures being observed at the same time, improving the shelf life. Particular preference is given to mixtures which, besides one or more compounds of the formula I, comprise one or more compounds of the formulae II and/or IV, in particular compounds of the formulae IIa and IVa in which X⁰ is F or OCF₃. The compounds of the formulae I to VI are colourless, stable and readily miscible with one another and with other liquid-crystalline materials.

The term "alkyl" covers straight-chain and branched alkyl groups having preferably 1–7 carbon atoms, in particular the straight-chain groups methyl, ethyl, propyl, butyl, pentyl, hexyl and heptyl. Groups having 2–5 carbon atoms are generally preferred.

The term "alkenyl" covers straight-chain and branched alkenyl groups having preferably 2–7 carbon atoms, in particular the straight-chain groups. Particular alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The terms "halogenated alkyl," "halogenated alkenyl," and "halogenated alkoxy" preferably refer to straight-chain groups having up to 6 carbon atoms and having a terminal halogen atom, e.g., a terminal fluorine or terminal chlorine.

The term "oxaalkyl" preferably covers straight-chain radicals of the formula $C_nH_{2n+1}$—O—$(CH_2)_m$, in which n and m are each, independently of one another, from 1 to 6. n is preferably=1 and m is preferably from 1 to 6.

Through a suitable choice of the meanings of R⁰ and X⁰, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-alkenyl radicals, 3-alkenyl radicals and the like generally give lower threshold voltages and smaller values of $k_{33}/k_{11}$ compared with alkyl and alkoxy radicals.

A —CH₂CH₂— group generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (greater multiplexability), and vice versa.

The optimum mixing ratio of the compounds of the formulae I and II+III+IV+V+VI depends substantially on the desired properties, on the choice of the components of the formulae I, II, III, IV, V and/or VI, and on the choice of any other components that may be present. Suitable mixing ratios within the range given above can easily be determined from case to case.

The total amount of compounds of the formulae I to XII in the mixtures according to the invention is not crucial. The mixtures can therefore comprise one or more further components for the purposes of optimizing various properties. However, the observed effect on the addressing times and the threshold voltage is generally greater, the higher the total concentration of compounds of the formulae I to XII.

In a particularly preferred embodiment, the media according to the invention comprise compounds of the formulae II to VI (preferably II, III and/or IV, in particular IVa)in which X⁰ is F, OCF₃, OCHF₂, F, OCH=CF₂, OCF=CF₂ or OCF₂—CF₂H. A favourable synergistic effect with the compounds of the formula I results in particularly advantageous properties. In particular, mixtures comprising compounds of the formula I and of the formula IVa are distinguished by their low threshold voltages.

The construction of the MLC display according to the invention from polarisers, electrode base plates and surface-treated electrodes corresponds to the conventional construction for displays of this type. The term "conventional construction" is broadly drawn here and also covers all derivatives and modifications of the MLC display, in particular including matrix display elements based on poly-Si TFT or MIM.

A significant difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in the lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature. For example, 0–15% of pleochroic dyes or chiral dopants can be added.

The present invention furthermore relates to the novel compounds of the formula I1.

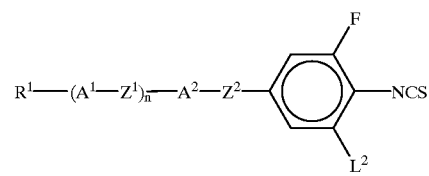

(I1)

in which $R^1$, $Z^1$, $Z^2$, n and $L^2$ are as defined in the formula I,

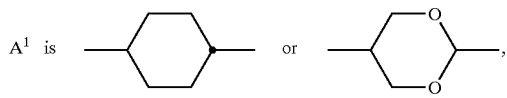

The synthesis of the compounds for the formula I1 is carried out as described in DE 40 27 869, or in a manner analogous thereto.

Thus, the compounds according to the invention, in particular those in which $L^2$ is F, can be prepared, for example, by metallating a compound of the formula I1-1

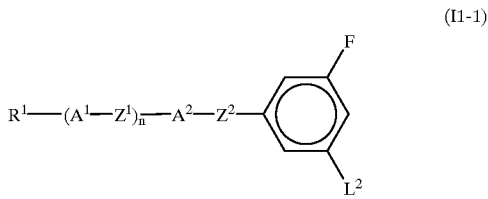

(I1-1)

in which the individual radicals are as defined in the formula I1, in accordance with Scheme 1 to give an amino compound of the formula I1-2, and converting the amino group into an isothiocyanate group using thiocarbonyldiimidazole or thiophosgene.

Scheme 1

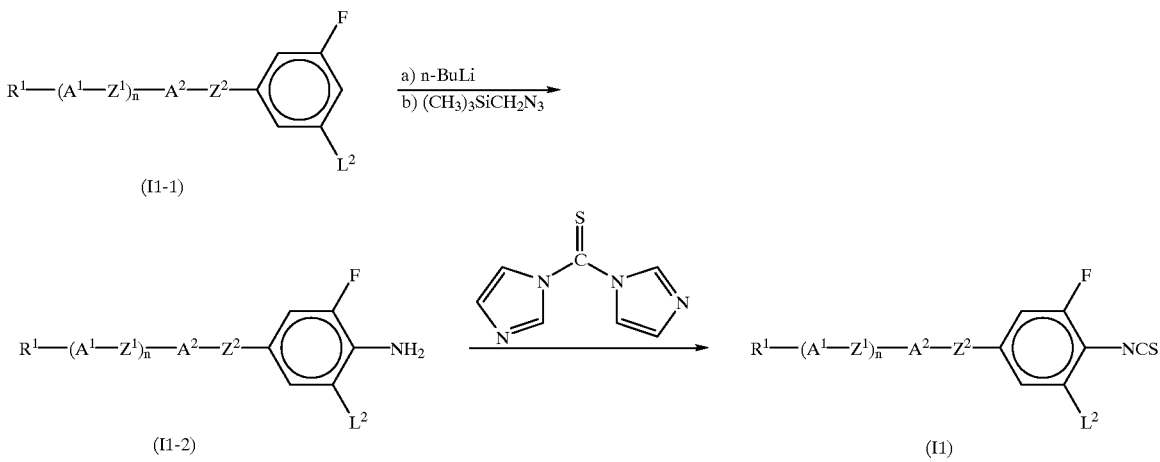

in which the individual radicals are as defined in the formula I1.

The linking of the ring elements to give the corresponding aniline precursor of the formula I1-2 is, for different bridges $Z^2$, based on different methods, but ones which are known in principle in liquid-crystal chemistry, which are described, inter alia, in E. Poetsch, Kontakte (Darmstadt) 1988(2), p.15.

-continued

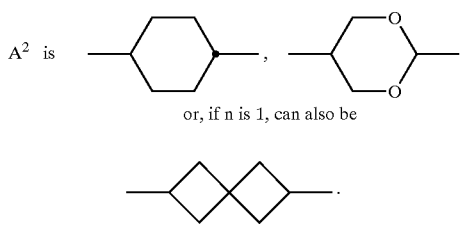

Particular preference is given to compounds of the formulae I1a to I1k according to the invention, in particular those of the formulae I1a, I1d, I1g and I1i, very particularly preferably those in which $L^2$ is F.

Further synthetic methods are evident to the person skilled in the art. For example, 1,3-difluorobenzene compounds which are appropriately substituted in the 5-position can be converted into the 2-NCS-1,3-difluoro compounds in accordance with the above Scheme 1, and the radical $R^1$—$(A^1—Z^1)_n$—$A^2$—$Z^2$ can subsequently be introduced by reactions which are customary in liquid-crystal chemistry, such as, for example, esterification, etherification or coupling, for example in accordance with E. Poetsch, Kontakte (Darmstadt) 1988(2), p. 15.

The compounds of the formula I1-1 in which $Z^2$ is CH=CH or $CH_2CH_2$ can be prepared, for example, in accordance with Scheme 2.

Scheme 2

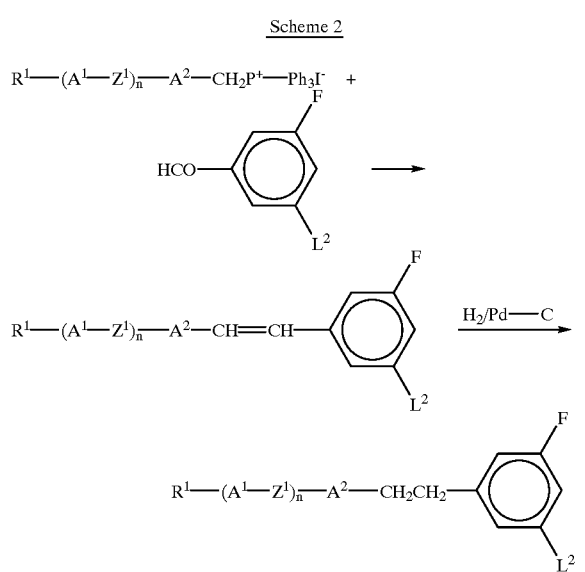

in which the individual radicals are as defined in the formula I1.

The compounds of the formula I1-1 in which $Z^2$ is a single bond can be prepared, for example, in accordance with Scheme 3 or 4.

Scheme 3

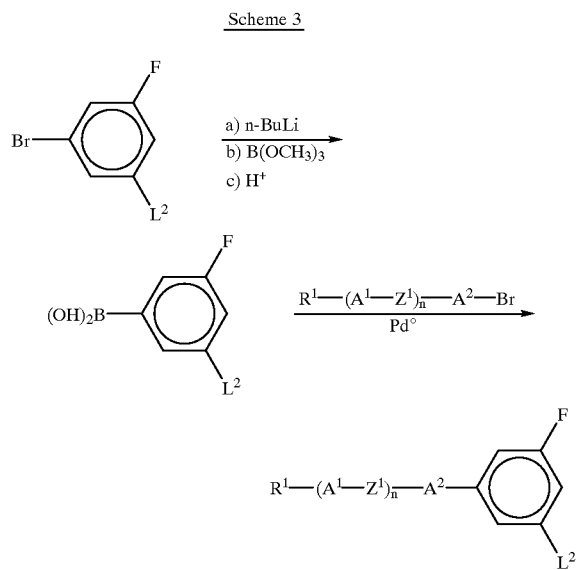

Scheme 4

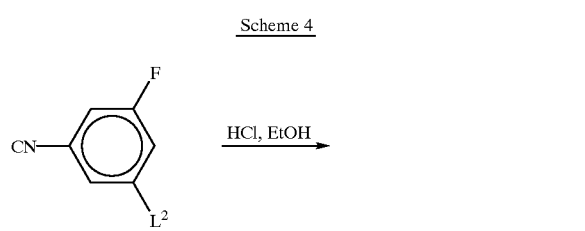

-continued

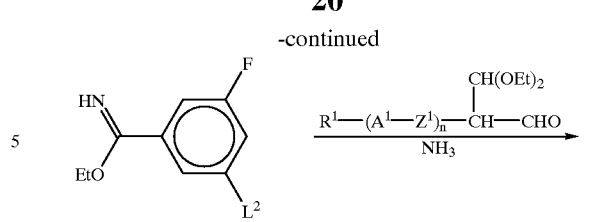

in which the individual radicals are as defined in the formula I1.

In the case of compounds of the formula I1 in which $Z^2$ is a single bond, the amino compounds of the formula I1-2 can also be prepared by cross-coupling, for example in accordance with Miyaura-Suzuki. The respective precursors are reacted in accordance with Scheme 5 in a Pd-catalyzed reaction.

Scheme 5

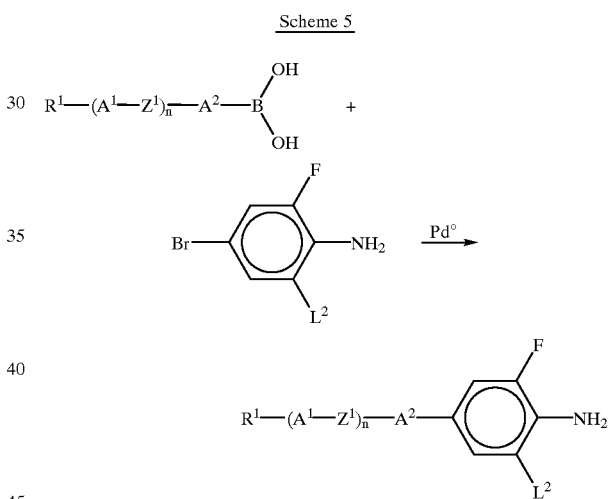

in which the individual radicals are as defined in the formula I1.

The amino compounds of the formula I1-2 in which $Z^2$ is CH=CH (stilbene derivatives) can be prepared, for example, in a so-called "Heck" reaction in accordance with Scheme 6. In this, an aryl halide is reacted with an olefin in the presence of a tertiary amine and a palladium catalyst, cf. R. F. Heck, Acc. Chem. Res. 12 (1979), 146.

Scheme 6

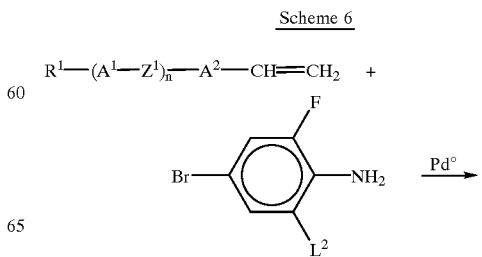

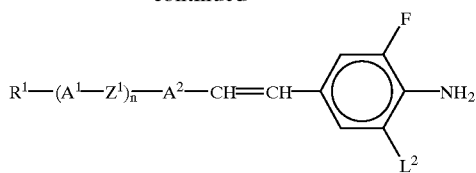

in which the individual radicals are as defined in the formula I1.

Examples of suitable aryl halides are chlorides, bromides and iodides, in particular bromides and iodides. The tertiary amines necessary for the success of the coupling reaction, such as, for example, triethylamine, are also suitable as solvent. Examples of suitable palladium catalysts are its salts, in particular Pd(II) acetate, with organophosphorus (III) compounds, such as, for example, triarylphosphines. This process can be carried out in the presence or absence of an inert solvent at temperatures between about 0 and 150° C., preferably between 20 and 100° C.; suitable solvents are, for example, nitrites, such as acetonitrile, or hydrocarbons, such as benzene or toluene. The aryl halides and olefins employed as starting materials are frequently commercially available or can be prepared by processes known from the literature, for example by halogenation of corresponding parent compounds or by elimination reactions on corresponding alcohols or halides.

The stilbenes may furthermore be prepared by reaction of a 4-substituted benzaldehyde with a corresponding phosphorus ylide by the Wittig method. However, it is also possible to prepare tolans of the formula I1 by employing monosubstituted acetylene instead of the olefin, cf. Synthesis 627(1980) or Tetrahedron Lett. 27, 1171 (1986).

Furthermore, aromatic compounds can be coupled by reacting aryl halides with aryltin compounds. These reactions are preferably carried out with addition of a catalyst, such as, for example, a palladium(0) complex, in insert solvents, such as hydrocarbons, at high temperatures, for example in boiling xylene, under a protective gas.

Coupling reactions of alkynyl compounds with aryl halides can be carried out analogously to the process described by A. O. King, E. Negishi, F. J. Villani and A. Silveira in J. Org. Chem. 43, 358 (1978).

Esters of the formula I1 can also be obtained by esterification of corresponding carboxylic acids or reactive derivatives thereof using alcohols or phenols or reactive derivatives thereof or by the DCC method (DCC= dicyclohexylcarbodiimide). The corresponding carboxylic acids and alcohols or phenols are known or can be prepared analogously to known processes.

Ethers of the formula I1 are obtainable by etherification of corresponding hydroxyl compounds, preferably corresponding phenols, the hydroxyl compound advantageously first being converted into a corresponding metal derivative, for example into the corresponding alkali metal alkoxide or alkali metal phenoxide, by treatment with NaH, $NaNH_2$, NaOH, KOH, $Na_2CO_3$ or $K_2CO_3$. This metal derivative can then be reacted with the appropriate alkyl halide, alkyl sulfonate or dialkyl sulfate, advantageously in an inert solvent, such as, for example, acetone, 1,2-dimethoxyethane, DMF or dimethyl sulfoxide, or alternatively with an excess of aqueous or aqueous-alcoholic NaOH or KOH, at temperatures between about 20 and 100° C.

The starting materials are either known or can be prepared analogously to known compounds.

The synthetic principle for the particularly preferred compounds of the formula I1g is shown by way of example in Schemes 7 and 8.

Scheme 7

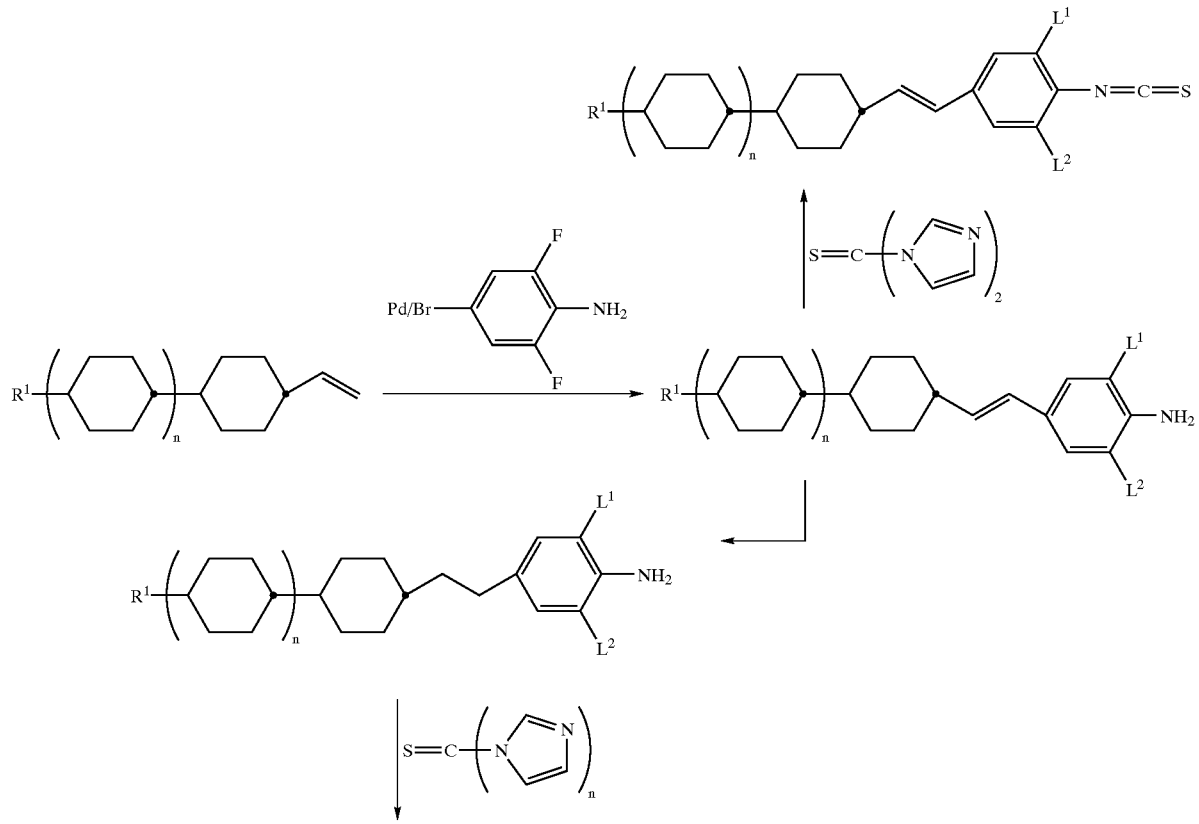

-continued

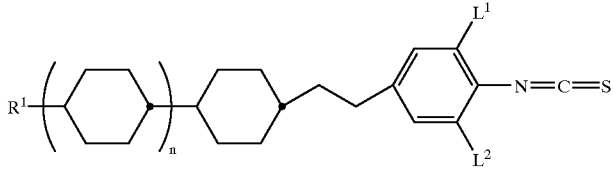

Scheme 8

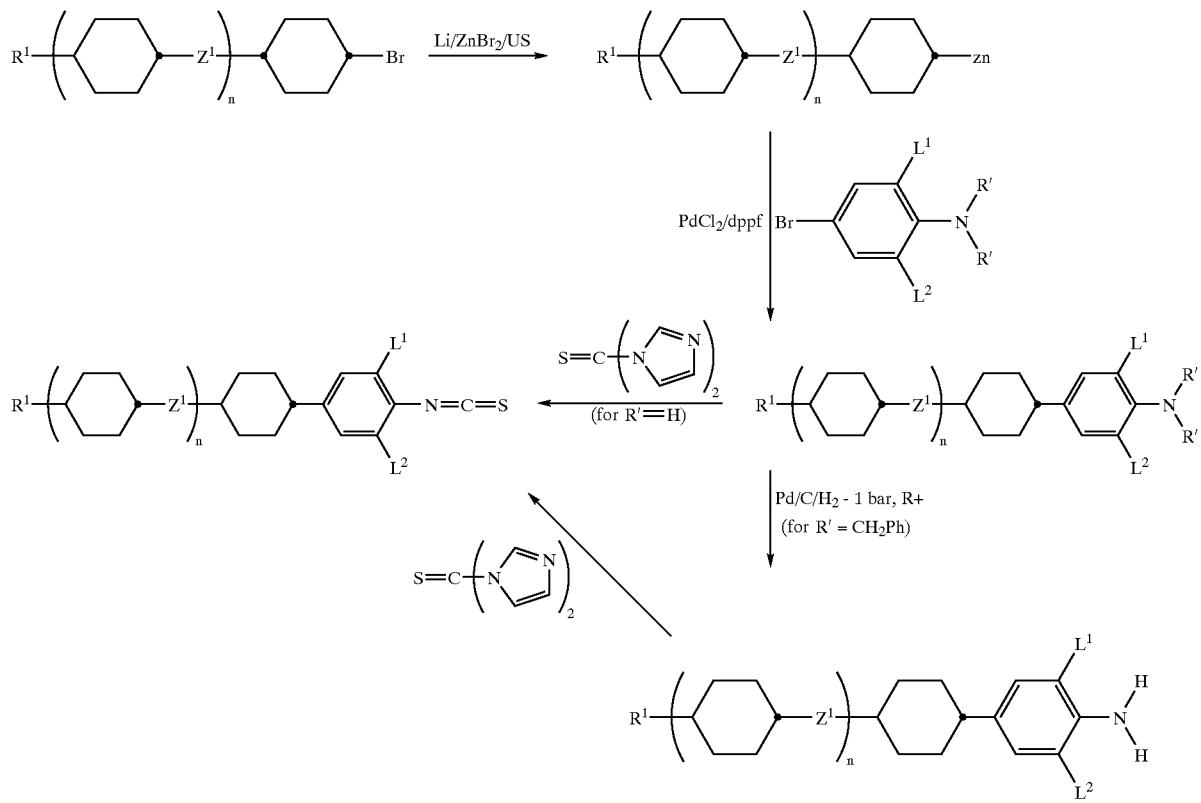

US=ultrasound
R'=H, CH$_2$Ph
zn=ZnBr or

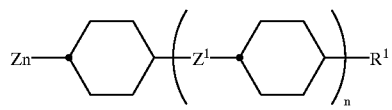

dppf=1,1'-bis(diphenylphosphino)ferrocene

Further synthetic methods are given in the following example.

The entire disclosure of all applications, patent and publications, cited above and below, and of corresponding European Patent No. 00109161.0, filed May 8, 2000 is hereby incorporated by reference.

EXAMPLES

The following examples are intended to illustrate the invention without limiting it. In these examples, C denotes a crystalline phase, S a smectic phase, S$_C$ a smectic C phase, N a nematic phase and I the isotropic phase. Above and below, percentages are per cent by weight. All temperatures are given in degrees Celsius. cl.p. denotes the clearing point (nematic-isotropic phase transition temperature). V$_{10}$ denotes the voltage for 10% transmission (viewing angle perpendicular to the plate surface). t$_{on}$ denotes the switch-on time and t$_{eff}$ the switch-off time at an operating voltage corresponding to 2.5 times the value of V$_{10}$. HR denotes the holding ratio (100° C., 5 min). Δn denotes the optical anisotropy and n$_o$ the ordinary refractive index at 589 nm. Δε denotes the dielectric anisotropy at 1 kHz (Δε=ε$_\parallel$−ε$_\perp$, where ε$_\parallel$ denotes the dielectric constant parallel to the longitudinal molecular axes and ε$_\perp$ denotes the dielectric constant perpendicular thereto). The electro-optical data were measured in a TN cell at the 1st minimum (i.e. at a d·Δn value of 0.5) at 20° C., unless expressly stated otherwise. γ$_1$ denotes the rotational viscosity. The above-mentioned data were measured at 20° C., unless expressly stated otherwise.

"Conventional work-up" means that water is added if necessary, the mixture is extracted with dichloromethane, diethyl ether or toluene, the phases are separated, the organic phase is dried and evaporated, and the product is purified by distillation under reduced pressure or crystallization and/or chromatography. ("RT" denotes room temperature).

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |

-continued

| Code for $R^1$, $R^2$, $L^1$, $L^2$ | $R^1$ | $R^2$ | $L^1$ | $L^2$ |
|---|---|---|---|---|
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |
| nOCCF$_2$.F.F | $C_nH_{2n+1}$ | $OCH_2CF_2H$ | F | F |

Preferred mixture components are shown in Tables A and B.

TABLE A

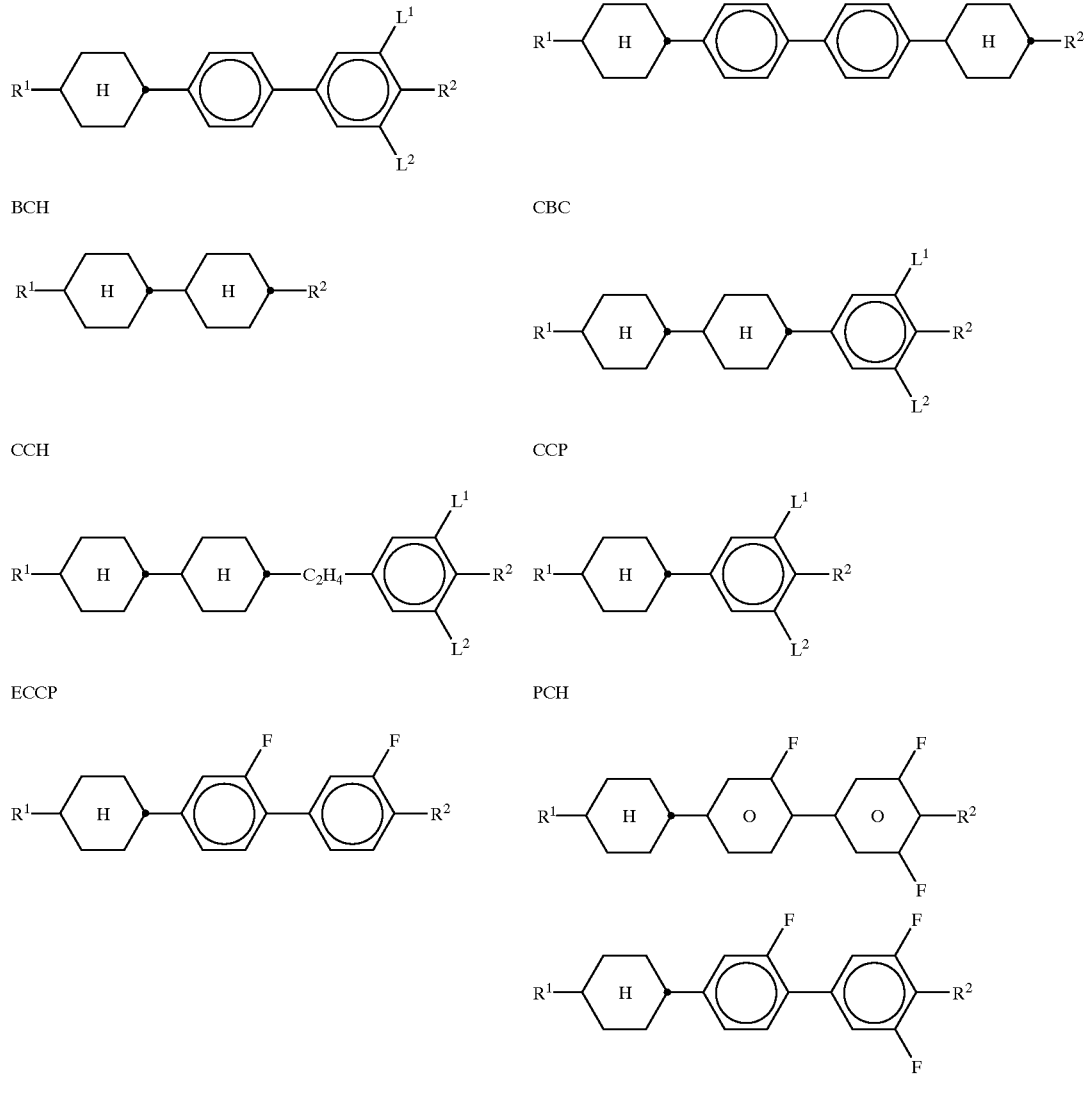

BCH

CBC

CCH

CCP

ECCP

PCH

CGG

CGU

TABLE B

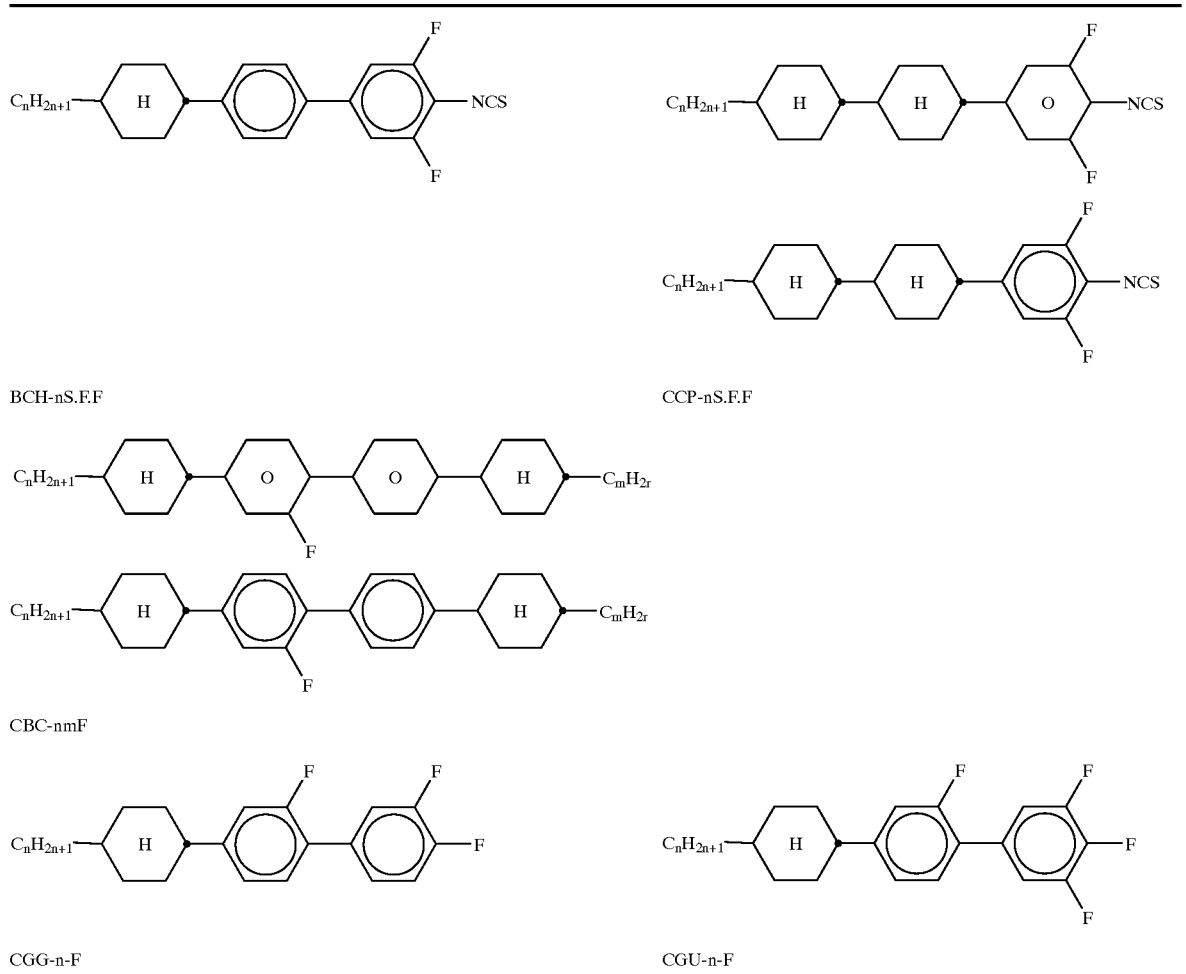

BCH-nS.F.F

CCP-nS.F.F

CBC-nmF

CGG-n-F

CGU-n-F

Example 1

4'-(3,5-difluoro-4-isothiocyanatophenyl)-4-ethylbicyclohexyl is prepared as follows in accordance with Scheme 8 ($R^1$=ethyl, n=1, $Z^1$=single bond, $L^1=L^2$=F).

1a) 507.5 g of 2,6-difluoroaniline are added to 2500 ml of acetic acid, the mixture is cooled to 10° C., and a solution of 195 ml of bromine in 250 ml of acetic acid is added dropwise at 10–15° C. over the course of 3 hours. The mixture is subsequently stirred at room temperature for a further 1 hour and poured into 5000 ml of ice-water, the precipitated crystals are filtered off with suction and washed a number of times with a total of 3000 ml of ice-water, and the crystals are dried over $Al_2O_3$ under reduced pressure, giving 4-bromo-2,6-difluoroaniline, yield 91.7%, GC 99.6%.

1b) A suspension of 416 g of 4-bromo-2,6-difluoroaniline, 752 g of benzyl bromide and 608 g of potassium carbonate in 2 l of acetonitrile is refluxed for 48 hours. The mixture is subsequently evaporated in a rotary evaporator, the residue is dissolved in toluene and extracted with hydrochloric acid (10%), the toluene phase is evaporated in a rotary evaporator, and the product is stirred into heptane and stirred with silica gel for about 4.5 hours, filtered with suction and evaporated in a rotary evaporator, giving dibenzyl(4-bromo-2,6-difluorophenyl)amine, yield 85.6%.

1c) 102 ml of bromine are added dropwise over the course of 2 hours at 5–15° C. to 536 g of triphenylphosphine in 2000 ml of acetonitrile, the mixture is subsequently stirred at 5° C. for 1 hour, 422 g of 4-(trans-4-ethyl-cyclohexyl) cyclohexanol are added, and the mixture is stirred at RT for 24 hours. Conventional work-up gives 4'-bromo-4-ethylbicyclohexane, GC 94.7%.

1d) 338 g of zinc bromide and 2.1 g of lithium are added at 5° C. to a solution of 43.3 g of 4'-bromo-4-ethylbicyclohexane in 500 ml of toluene, and the mixture is treated with ultrasound for 4 hours. The cooling is subsequently removed, 61.8 g of dibenzyl(4-bromo-2,6-difluorophenyl)-amine and 1.2 g of $PdCl_2$-dppf are added, and the mixture is stirred at RT for 72 hours. Conventional work-up gives dibenzyl[4-(4'-ethylbicyclohexyl-4-yl)-2,6-difluorophenyl]amine.

1e) 40.8 g of dibenzyl[4-(4'-ethylbicyclohexyl-4-yl)-2,6-difluorophenyl]-amine are hydrogenated using 10 g of Pd/C/$H_2$ (5%) in 400 ml of THF. Conventional work-up gives 4-(4'-ethylbicyclohexyl-4-yl)-2,6-difluorophenylamine.

1f) 9.5 g of 1,1-thiocarbonyldiimidazole are added to 85 g of 4-(4'-ethylbicyclohexyl-4-yl)-2,6-difluorophenylamine in 100 ml of dichloromethane, and the mixture is stirred at RT. Conventional work-up gives 4'-(3,5-difluoro-4-isothiocyanatophenyl)-4-ethylbicyclohexyl, yield 59%, having the following properties: C 33 N 198.2 I; Δε 15.3; Δn 0.1930.

Example 2

4'-(3,5-Difluoro-4-isothiocyanatophenyl)-4-n-propylbicyclohexyl is prepared as follows in accordance with Scheme 8 ($R^1$=n-propyl, n=1, $Z^1$=single bond, $L^1$=$L^2$=F).

4.9 ml of thiophosgene are added dropwise over the course of 30 minutes at 15–25° C. to 18.4 g of imidazole in 150 ml of dichloromethane, and the mixture is stirred at RT for a further 2 hours. 15.8 g of 4-(4'-n-propylbicyclohexyl-4-yl)-2,6-difluorophenylamine (prepared as described in Examples 1a–1e) are subsequently added, and the mixture is stirred at RT for 24 hours. Conventional work-up gives 4'-(3,5-difluoro-4-isothiocyanatophenyl)-4-n-propylbicyclohexyl having the following properties: C 65 N 225.5 1; Δε 16.0; Δn 0.1990.

The following compounds according to the invention are obtained analogously from the corresponding precursors of the formula I1 (Phe=1,4-phenylene, Cyc=1,4-cyclohexylene, Dio=1,3-dioxane-2,5-diyl, Spi=spiro[3.3]heptane-2,6-diyl).

| No. | $R^1$ | -($A^1$-$Z^1$)$_n$-$A^2$-$Z^2$- | $L^2$ | Properties |
|---|---|---|---|---|
| 2 | methyl | -Cyc-Cyc- | H | C 75 N 189.2 I Δε 14.1; Δn 0.2070 |
| 3 | ethyl | -Cyc-Cyc- | H | C 55 N 213.7 I Δε 14.1; Δn 0.2020 |
| 4 | n-propyl | -Cyc-Cyc- | H | C 80 N 240.5 I Δε 12.5; Δn 0.2090 |
| 5 | n-pentyl | -Cyc-Cyc- | H | C 52 N 223.7 I Δε 12.5; Δn 0.2080 |
| 6 | methoxy | -Cyc-Cyc- | H | |
| 7 | n-propoxy | -Cyc-Cyc- | H | |
| 8 | n-butoxy | -Cyc-Cyc- | H | |
| 9 | n-hexyloxy | -Cyc-Cyc- | H | |
| 10 | methyl | -Cyc-Cyc- | F | C 57 N 174.2 I Δε 15.0; Δn 0.1960 |
| 11 | n-butyl | -Cyc-Cyc- | F | |
| 12 | n-pentyl | -Cyc-Cyc- | F | C 63 N 215.8 I Δε 14.5; Δn 0.1860 |
| 13 | methoxy | -Cyc-Cyc- | F | |
| 14 | n-propoxy | -Cyc-Cyc- | F | |
| 15 | n-hexyloxy | -Cyc-Cyc- | F | |
| 16 | methyl | -Cyc-Cyc-$CH_2CH_2$- | H | |
| 17 | ethyl | -Cyc-Cyc-$CH_2CH_2$- | H | |
| 18 | n-propyl | -Cyc-Cyc-$CH_2CH_2$- | H | C 74 N 192.6 I Δε 12.1; Δn 0.1950 |
| 19 | n-pentyl | -Cyc-Cyc-$CH_2CH_2$- | H | C 61 N 188.2 I Δε 11.8; Δn 0.1760 |
| 20 | methoxy | -Cyc-Cyc-$CH_2CH_2$- | H | |
| 21 | n-propoxy | -Cyc-Cyc-$CH_2CH_2$- | H | |
| 22 | n-hexyloxy | -Cyc-Cyc-$CH_2CH_2$- | H | |
| 23 | methyl | -Cyc-Cyc-$CH_2CH_2$- | F | |
| 24 | ethyl | -Cyc-Cyc-$CH_2CH_2$- | F | |
| 25 | n-propyl | -Cyc-Cyc-$CH_2CH_2$- | F | C 85 N 184.8 I Δε 14.7; Δn 0.1830 |
| 26 | n-pentyl | -Cyc-Cyc-$CH_2CH_2$- | F | C 51 N 179.2 I Δε 13.1; Δn 0.1840 |
| 27 | methoxy | -Cyc-Cyc-$CH_2CH_2$- | F | |
| 28 | n-propoxy | -Cyc-Cyc-$CH_2CH_2$- | F | |
| 29 | n-hexyloxy | -Cyc-Cyc-$CH_2CH_2$- | F | |
| 30 | methyl | -Cyc- | H | |
| 31 | ethyl | -Cyc- | H | |
| 32 | n-propyl | -Cyc- | H | C 35 N (31.8) I Δε 13.8; Δn 0.1910 |
| 33 | n-butyl | -Cyc- | H | |
| 34 | n-pentyl | -Cyc- | H | C 67 N (40.7) I Δε 12.5; Δn 0.1810 |
| 35 | methoxy | -Cyc- | H | |
| 36 | n-propoxy | -Cyc- | H | |
| 37 | n-butoxy | -Cyc- | H | |
| 38 | n-hexyloxy | -Cyc- | H | |
| 39 | methyl | -Cyc- | F | |
| 40 | ethyl | -Cyc- | F | |
| 41 | n-propyl | -Cyc- | F | C 45 N (8.4) I Δε 14.5; Δn 0.1690 |
| 42 | n-pentyl | -Cyc- | F | C 45 N (26.2) I Δε 13.2; Δn 0.1550 |
| 43 | methoxy | -Cyc- | F | |
| 44 | n-propoxy | -Cyc- | F | |
| 45 | n-butoxy | -Cyc- | F | |
| 46 | n-hexyloxy | -Cyc- | F | |
| 47 | methyl | -Cyc-$CH_2CH_2$- | H | |
| 48 | n-propyl | -Cyc-$CH_2CH_2$- | H | |
| 49 | n-pentyl | -Cyc-$CH_2CH_2$- | H | |
| 50 | methoxy | -Cyc-$CH_2CH_2$- | H | |
| 51 | n-propoxy | -Cyc-$CH_2CH_2$- | H | |
| 52 | n-hexyloxy | -Cyc-$CH_2CH_2$- | H | |
| 53 | methyl | -Cyc-$CH_2CH_2$- | F | |
| 54 | n-propyl | -Cyc-$CH_2CH_2$- | F | C 30 N (20.7) I Δε 13.0; Δn 0.1490 |
| 55 | n-pentyl | -Cyc-$CH_2CH_2$- | F | |
| 56 | methoxy | -Cyc-$CH_2CH_2$- | F | |
| 57 | n-propoxy | -Cyc-$CH_2CH_2$- | F | |
| 58 | n-hexyloxy | -Cyc-$CH_2CH_2$- | F | |
| 59 | methyl | -Cyc-Spi- | H | |
| 60 | ethyl | -Cyc-Spi- | H | C 43 N 134.2 I Δε 12.7; Δn 0.2010 |
| 61 | n-propyl | -Cyc-Spi- | H | |
| 62 | n-pentyl | -Cyc-Spi- | H | C 43 N 155.2 I Δε 12.0; Δn 0.2000 |
| 63 | methoxy | -Cyc-Spi- | H | |
| 64 | n-propoxy | -Cyc-Spi- | H | |
| 65 | n-hexyloxy | -Cyc-Spi- | H | |
| 66 | methyl | -Cyc-Spi- | F | |
| 67 | ethyl | -Cyc-Spi- | F | C 44 N 125.8 I Δε 13.3; Δn 0.1810 |
| 68 | n-propyl | -Cyc-Spi- | F | C 48 N 152.6 I Δε 14.0; Δn 0.1900 |
| 69 | n-pentyl | -Cyc-Spi- | F | C 42 N 145.3 I Δε 13.4; Δn 0.1870 |
| 70 | methoxy | -Cyc-Spi- | F | |
| 71 | n-propoxy | -Cyc-Spi- | F | |
| 72 | n-hexyloxy | -Cyc-Spi- | F | |
| 73 | methyl | -Cyc-Dio- | H | |
| 74 | ethyl | -Cyc-Dio- | H | |
| 75 | n-propyl | -Cyc-Dio- | H | |
| 76 | n-pentyl | -Cyc-Dio- | H | |
| 77 | methoxy | -Cyc-Dio- | H | |
| 78 | n-propoxy | -Cyc-Dio- | H | |
| 79 | n-hexyloxy | -Cyc-Dio- | H | |
| 80 | methyl | -Cyc-Dio- | F | C 95 N 121.1 I Δε 22.7; Δn 0.1780 |
| 81 | ethyl | -Cyc-Dio- | F | C 81 N 151.3 I Δε 21.5; Δn 0.1770 |
| 82 | n-propyl | -Cyc-Dio- | F | C 67 N 184.6 I Δε 21.7; Δn 0.1860 |
| 83 | n-pentyl | -Cyc-Dio- | F | C 92 N 185.1 I Δε 20.6; Δn 0.1790 |
| 84 | methoxy | -Cyc-Dio- | F | |
| 85 | n-propoxy | -Cyc-Dio- | F | |
| 86 | n-hexyloxy | -Cyc-Dio- | F | |
| 87 | methyl | -Dio- | H | |
| 88 | ethyl | -Dio- | H | |
| 89 | n-propyl | -Dio- | H | |
| 90 | n-pentyl | -Dio- | H | |
| 91 | methoxy | -Dio- | H | |
| 92 | n-propoxy | -Dio- | H | |
| 93 | n-hexyloxy | -Dio- | H | |
| 94 | methyl | -Dio- | F | |
| 95 | ethyl | -Dio- | F | C 42 I Δε 23.6; Δn 0.1410 |
| 96 | n-propyl | -Dio- | F | C 61 I Δε 23.2; Δn 0.1470 |
| 97 | n-pentyl | -Dio- | F | C 37 I Δε 20.8; Δn 0.1460 |
| 98 | methoxy | -Dio- | F | |
| 99 | n-propoxy | -Dio- | F | |
| 100 | n-hexyloxy | -Dio- | F | |

Comparative Example of a Liquid-Crystal Mixture

A liquid-crystal mixture from the prior art comprising

| | | | |
|---|---|---|---|
| CCP-2F.F.F | 12.00% | cl.p.: | 74.5° C. |
| CCP-3F.F.F | 13.00% | Δn: | 0.0930 |
| CCP-5F.F.F | 8.00% | $n_o$: | 1.4778 |
| CCP-2OCF3 | 10.00% | Δε: | 10.5 |
| CCP-3OCF3 | 8.00% | $\varepsilon_\perp$: | 4.1 |
| CCP-4OCF3 | 7.00% | HR: | 84.2 |
| CCP-5OCF3 | 8.00% | | |
| CGU-2-F | 12.00% | | |
| CGU-3-F | 12.00% | | |
| CGU-5-F | 10.00% | | |

Mixture Example 1

A liquid-crystal mixture according to the invention comprising

| | | | |
|---|---|---|---|
| CCP-2F.F.F | 9.60% | cl.p.: | 105.5° C. |
| CCP-3F.F.F | 10.40% | Δn: | |
| CCP-5F.F.F | 6.40% | $n_o$: | |
| CCP-2OCF3 | 8.00% | Δε: | 10.6 |
| CCP-3OCF3 | 6.40% | $\varepsilon_\perp$: | 3.9 |
| CCP-4OCF3 | 5.60% | HR: | 86.4 |
| CCP-5OCF3 | 6.40% | | |
| CGU-2-F | 9.60% | | |
| CGU-3-F | 9.60% | | |
| CGU-5-F | 8.00% | | |
| CCP-3S.F.F | 20.00% | | | has a significantly higher clearing point and a higher HR compared with the comparative example.

Mixture Example 2

A liquid-crystal mixture according to the invention comprising

| | | | |
|---|---|---|---|
| CCP-2F.F.F | 9.60% | cl.p.: | 89.5° C. |
| CCP-3F.F.F | 10.40% | Δn: | |
| CCP-5F.F.F | 6.40% | $n_o$: | |
| CCP-2OCF3 | 8.00% | Δε: | 12.9 |
| CCP-3OCF3 | 6.40% | $\varepsilon_\perp$: | 4.0 |
| CCP-4OCF3 | 5.60% | HR: | 84.8 |
| CCP-5OCF3 | 6.40% | | |
| CGU-2-F | 9.60% | | |
| CGU-3-F | 9.60% | | |
| CGU-5-F | 8.00% | | |
| BCH-3S.F.F | 20.00% | | | has a higher clearing point and a higher HR compared with the comparative example.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium comprising polar compounds of positive dielectric anisotropy, said medium comprising one or more compounds of formula I

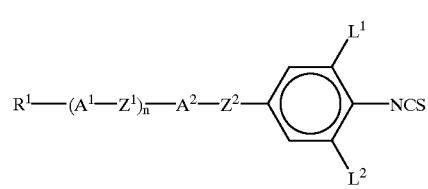

wherein $R^1$ is alkyl having 1 to 12 carbon atoms, alkoxy having 1 to 12 carbon atoms or an alkenyl group having 1 to 12 carbon atoms, in which, in addition, in each case one or two non-adjacent $CH_2$ are each optionally replaced by —O—, —CH=CH—, —CO—, —OCO— or —COO— in which O atoms are not linked directly to one another, $Z^1$ and $Z^2$ are each, independently of one another, —O—, —COO—, —OCO—, —$CH_2CH_2$—, —CH=CH—, —$CF_2CF_2$—, $CF_2O$—, —$OCF_2$—, —$CH_2O$—, —$OCH_2$—, —CF=CF— or a single bond, $A^1$ and $A^2$ are each, independently of one another,

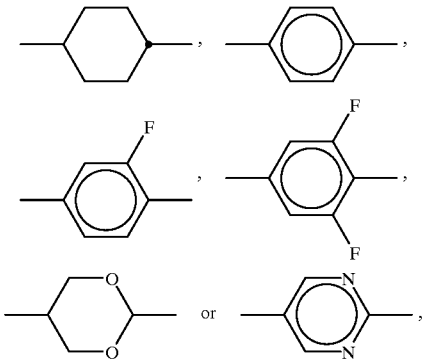

$A^2$, if n is 1, can also be

n is 0 or 1, and $L^1$ and $L^2$ are each, independently of one another, H or F.

said medium further comprising one or more compounds of formulae II, III, IV, V and VI:

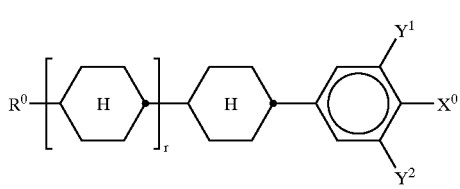

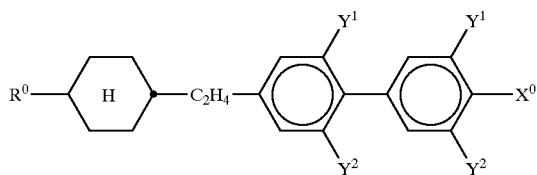

III

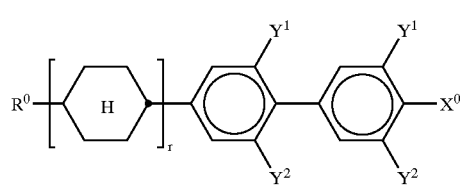

IV

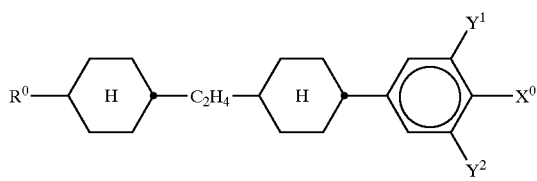

V

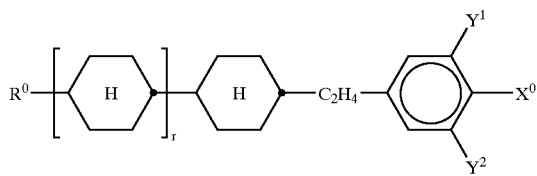

VI wherein,
$R^0$ is n-alkyl, oxaalkyl, fluoroalkyl or alkenyl, each having up to 7 carbon atoms,
$X^0$ is F, Cl, or halogenated alkyl, halogenated alkenyl or halogenated alkoxy, each having up to 6 carbon atoms,
$Y^1$ and $Y^2$ are each, independently of one another, H or F, and
r: is 0 or 1.
wherein said medium has a clearing point of 85° C. or higher.

2. A medium according to claim 1, wherein the compounds of formula I are selected from the following formulae:

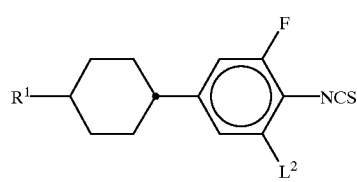

I1a

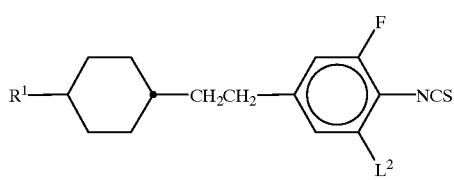

I1c

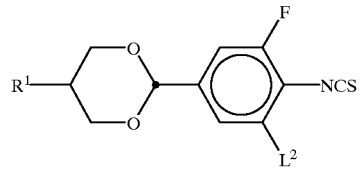

I1d

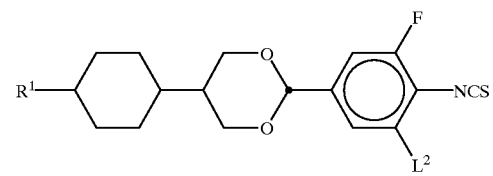

I1e

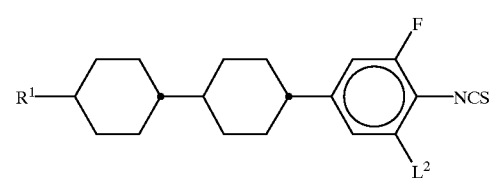

I1g

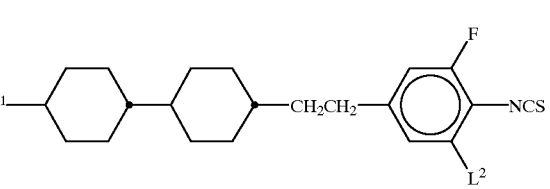

I1m

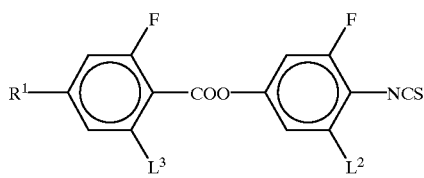

I2b

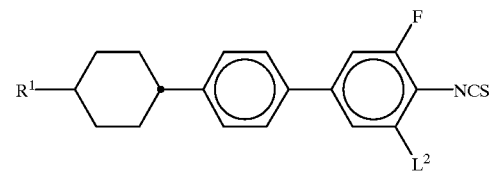

I2d

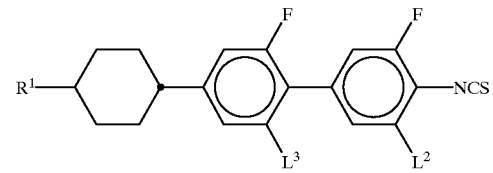

I2e

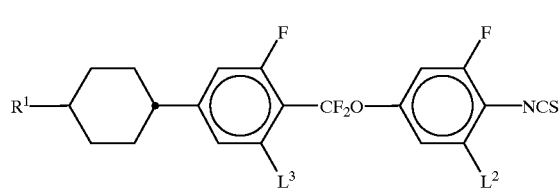

I2f

I2g

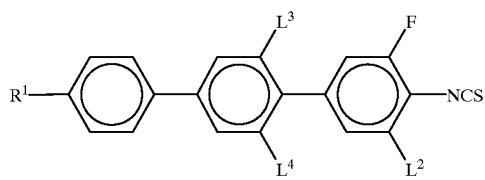

wherein L², L³ and L⁴ are each, independently of one another, H or F.

3. A medium according to claim 1, wherein the proportion of compounds of formula I is 3–80% by weight of the total weight.

4. A medium according to claim 3, wherein the compounds of formula I are selected from the following formulae:

IIa

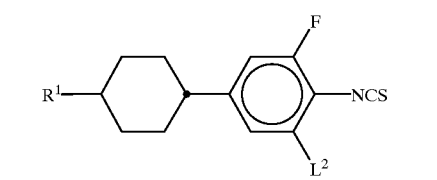

I1c

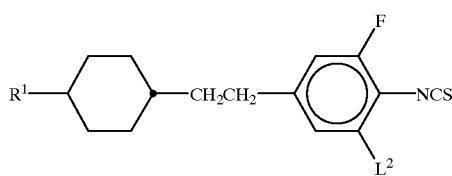

I1d

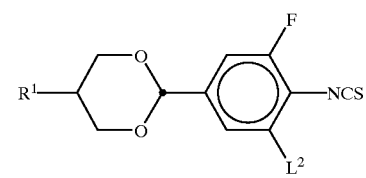

I1e

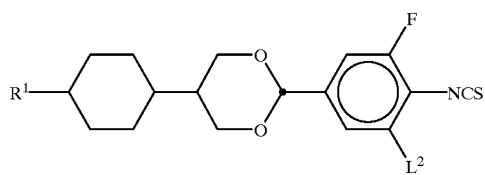

I1g

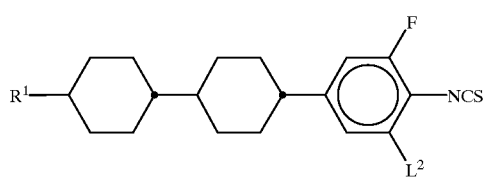

I1m

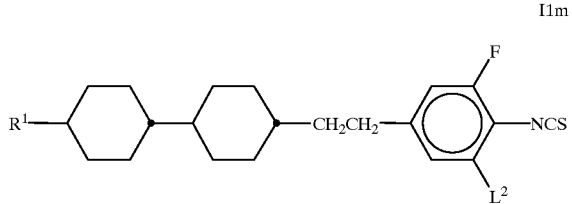
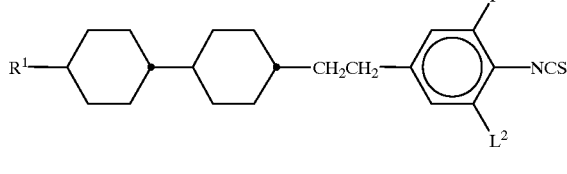

I2b

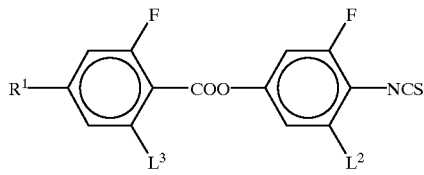

I2d

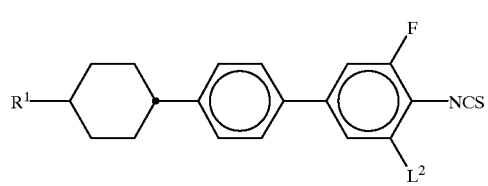

I2e

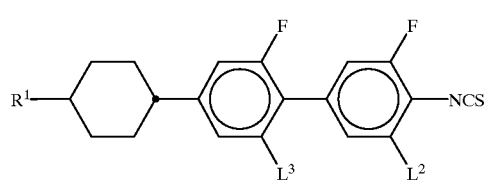

I2f

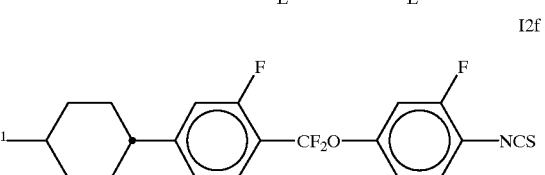

I2g

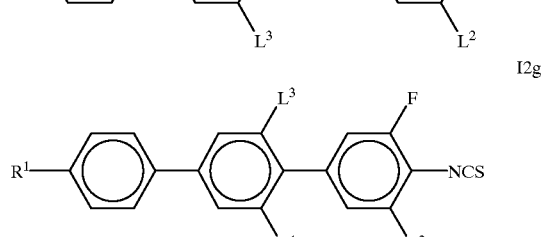

wherein L², L³ and L⁴ are each, independently of one another, H or F.

5. A medium according to claims 1, wherein proportion of compounds of formulae II to VI is 20–80% by weight of the total weight.

6. A medium according to claim 1, further comprising one or more compounds of formula IIa and IVa IIa

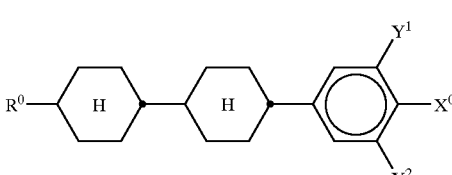

IVa

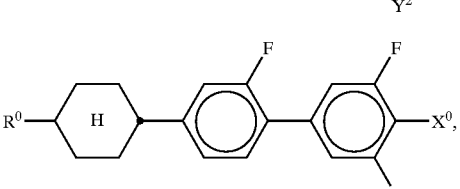

7. A medium according to claim 6, wherein in the formula IIa, X⁰ is F or OCF₃, and Y¹ and Y² are each, independently, H or F, and, in formula IVa, X⁰ is F.

8. A liquid-crystal compound of formula I1

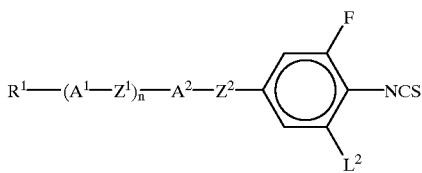

wherein
$R^1$ is alkyl having 1 to 12 carbon atoms, alkoxy having 1 to 12 carbon atoms or an alkenyl group having 1 to 12 carbon atoms, in which, in addition, in each case, one or two non-adjacent $CH_2$ are each optionally replaced by —O—, —CH=CH—, —CO—, —OCO— or —COO— in which O atoms are not linked directly to one another, $Z^1$ and $Z^2$ are each, independently of one another, —O—, —COO—, —OCO—, —$CH_2CH_2$—, —CH=CH—, —$CF_2CF_2$—, $CF_2O$—, —$OCF_2$—, —$CH_2O$—, —$OCH_2$—, —CF=CF— or a single bond,

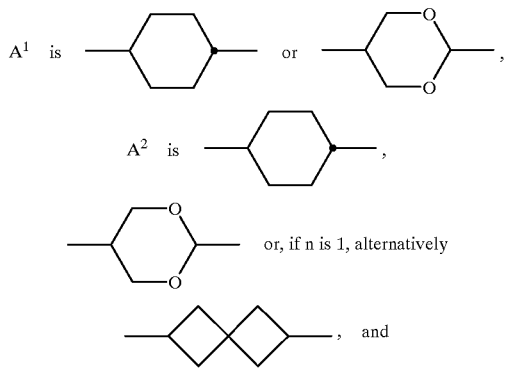

n is 0 or 1, and
$L^1$ and $L^2$ are each, independently of one another, H or F. with the provisos that:
a) if $L^2$ is H, n is 0 and $Z^2$ is —COO—, then $A^2$ is 1,3-dioxane-2,5-diyl or spiro[3.3]heptane-2,6-diyl
b) if $L^2$ is H, n is 1, $Z^1$ is —$CH_2CH_2$— and $Z^2$ is a single bond, then at least one of $A^1$ and $A^2$ is 1,3-dioxane-2,5-diyl, or $A^2$ is spiro[3.3]heptane-2,6-diyl, or both,
c) if n is 1, $A^1$ and $A^2$ are cyclohexylene, $Z^1$ is a single bond and $Z^2$ is —$CH_2CH_2$— or a single bond, then $L^2$ is H.

9. In an electro-optical liquid-crystal display containing a liquid-crystalline medium, the improvement wherein said medium is in accordance with claim 1.

10. In a method of generating an electro-optical effect comprising applying a voltage to a liquid-crystal display containing a liquid-crystalline medium, the improvement wherein said display contains a medium according to claim 1.

11. In an electro-optical liquid-crystal display containing a liquid-crystalline medium, the improvement wherein said medium contains at least one compound according to claim 8.

12. In a method of generating an electro-optical effect comprising applying a voltage to a liquid-crystal display containing a liquid-crystalline medium, the improvement wherein said display contains a medium which contains at least one compound according to claim 8.

13. A liquid crystalline medium according to claim 1, wherein said medium has a nematic phase down to −20° C., a clearing point above 80° C., a dielectric anisotropy value $\Delta\epsilon$ of $\geq 5$, and a TN threshold below 2.0 V.

14. A liquid crystalline medium according to claim 1, wherein said medium has a rotational viscosity at 20° C. of <150 mPa.s.

15. A liquid crystalline medium according to claim 1, wherein said medium exhibits a nematic phase range of at least 90° C.

16. A liquid crystalline medium according to claim 1, wherein the amount of compounds of formula I to VI as a whole are at least 50% by weight.

17. A liquid crystalline medium according to claim 1, wherein the total amount of compounds of formula I is 5–50 wt %.

18. A liquid crystalline medium according to claim 1, wherein the amount of compounds of formula II to VI is 20–90 wt %.

19. A liquid crystalline medium according to claim 1, wherein the weight ratio of the amount of compounds of formula I to the sum of the amounts of compounds of formula II-VI is 1:10–10:1.

20. A liquid-crystalline medium comprising polar compounds of positive dielectric anisotropy, said medium comprising:
one or more compounds of formula I

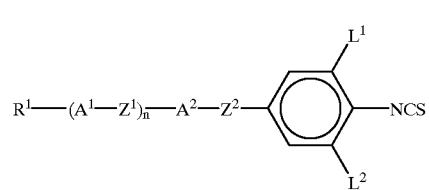

wherein
$R^1$ is alkyl having 1 to 12 carbon atoms, alkoxy having 1 to 12 carbon atoms or an alkenyl group having 1 to 12 carbon atoms, in which, in addition, in each case one or two non-adjacent $CH_2$ are each optionally replaced by —O—, —CH=CH—, —CO—, —OCO— or —COO— in which O atoms are not linked directly to one another, $Z^1$ and $Z^2$ are each, independently of one another, —O—, —COO—, —OCO—, —$CH_2CH_2$—, —CH=CH—, —$CF_2CF_2$—, $CF_2O$—, —OCF2—, —$CH_2O$—, —$OCH_2$—, —CF=CF— or a single bond, $A^1$ and $A^2$ are each, independently of one another,

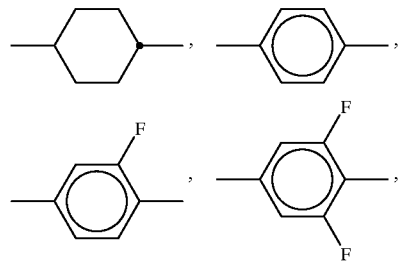

-continued

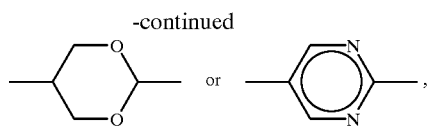

$A^2$, if n is 1, can also be

n is 0 or 1, and
$L^1$ and $L^2$ are each, independently of one another, H or F; and one or more compounds of formula IVa,

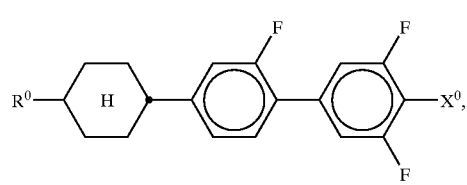

wherein
$R^0$ is n-alkyl, oxaalkyl, fluoroalkyl or alkenyl, each having up to 9 carbon atoms and
$X^0$ is F, Cl, or halogenated alkyl, halogenated alkenyl or halogenated alkoxy each having up to 6 carbon atoms.

21. A liquid-crystalline medium according to claim 1, wherein said medium contains one or more compounds of formula IV,

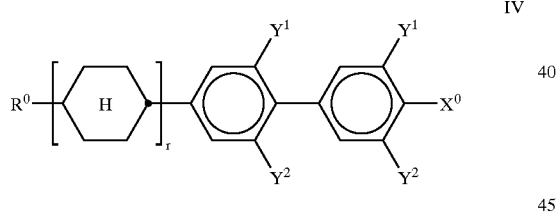

wherein
$R^0$ is n-alkyl, oxaalkyl, fluoroalkyl or alkenyl, each having up to 9 carbon atoms
$X^0$ is F, Cl, or halogenated alkyl, halogenated alkenyl or halogenated alkoxy, each having up to 6 carbon atoms
$Y^1$ and $Y^2$ are each, independently of one another, H or F, and
r is 0 or 1;and
optionally, one or more compounds of formula XII

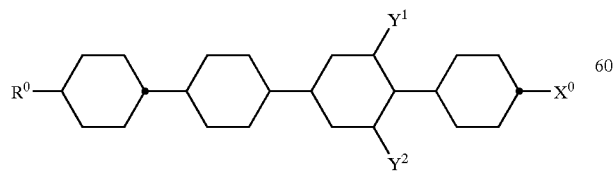

wherein $R^0$, $X^0$, $Y^1$ and $Y^2$ have the meanings defined in formula IV.

22. A liquid-crystalline medium comprising polar compounds of positive dielectric anisotropy, said medium comprising:

one or more compounds of formula I

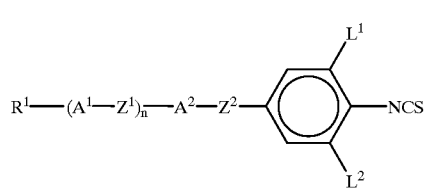

wherein
$R^1$ is alkyl having 1 to 12 carbon atoms, alkoxy having 1 to 12 carbon atoms or an alkenyl group having 1 to 12 carbon atoms, in which, in addition, in each case one or two non-adjacent $CH_2$ are each optionally replaced by —O—, —CH=CH—, —CO—, —OCO— or —COO— in which O atoms are not linked directly to one another,
$Z^1$ and $Z^2$ are each, independently of one another, —O—, —COO—, —OCO—, —$CH_2CH_2$—, —CH=CH—, —$CF_2CF_2$—, $CF_2O$—, —$OCF_2$—, —$CH_2O$—, —$OCH_2$—, —CF=CF— or a single bond,
$A^1$ and $A^2$ are each, independently of one another,

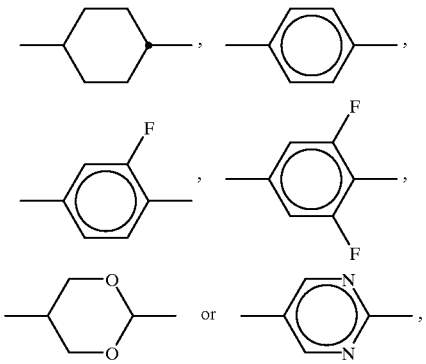

$A^2$, if n is 1, can also be

n is 0 or 1, and
$L^1$ and $L^2$ are each, independently of one another, H or F; and one or more compounds of formula II-IV

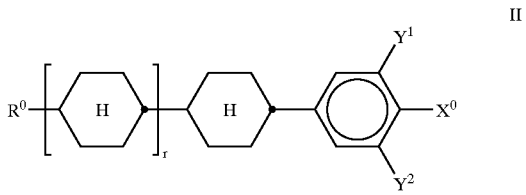

-continued

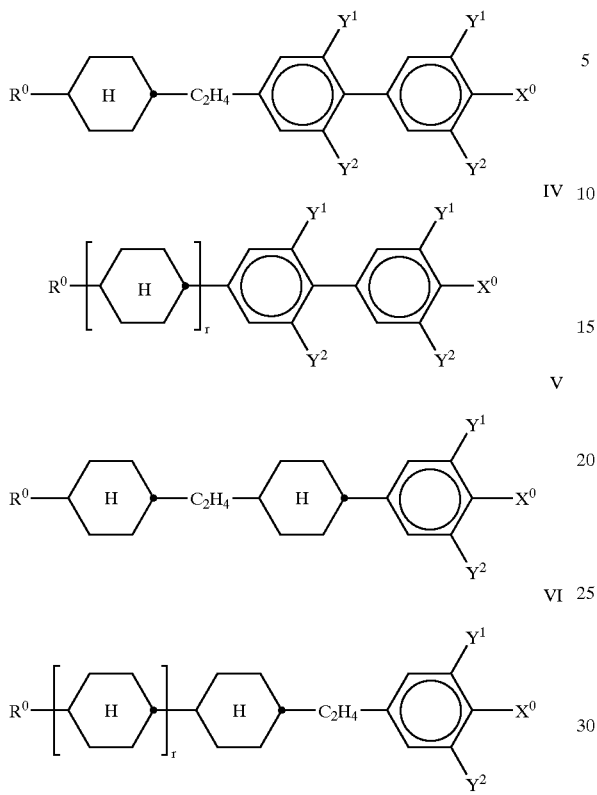

wherein,

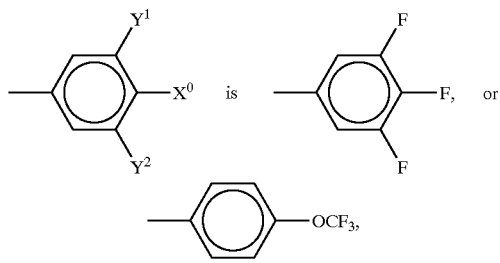

$R^0$ is n-alkyl, oxaalkyl, fluoroalkyl or alkenyl, each having up to 7 carbon atoms, and
r is 0 or 1.

23. A liquid-crystalline medium comprising polar compounds of positive dielectric anisotropy, said medium comprising:
one or more compounds of formula I

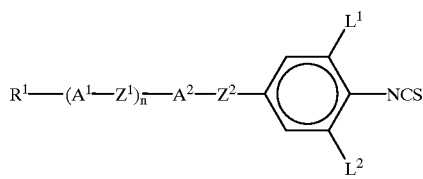

wherein
$R^1$ is alkyl having 1 to 12 carbon atoms, alkoxy having 1 to 12 carbon atoms or an alkenyl group having 1 to 12 carbon atoms, in which, in addition, in each case one or two non-adjacent $CH_2$ are each optionally replaced by —O—, —CH=CH—, —CO—, —OCO— or —COO— in which O atoms are not linked directly to one another, $Z^1$ and $Z^2$ are each, independently of one another, —O—, —COO—, —OCO—, —$CH_2CH_2$—, —CH=CH—, —$CF_2CF_2$—, $CF_2O$—, —$OCF_2$—, —$CH_2O$—, —$OCH_2$—, —CF=CF— or a single bond, $A^1$ and $A^2$ are each, independently of one another,

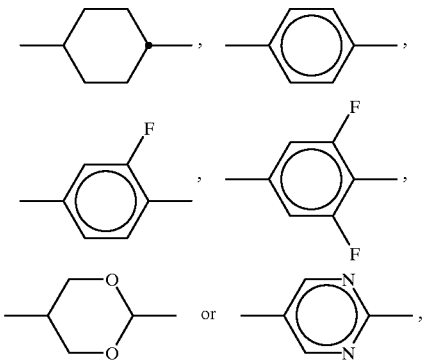

$A^2$, if n is 1, can also be

n is 0 or 1, and
$L^1$ and $L^2$ are each, independently of one another, H or F; and
one or more mesogenic compounds containing a 3,4,5-trifluorophenyl group.

24. A liquid-crystal compound of formulae I1d, I1e, or I1f

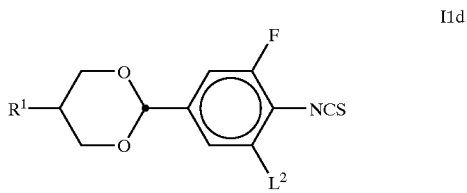

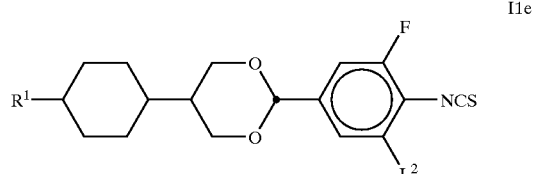

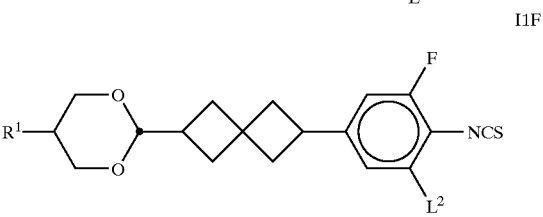

wherein
$R^1$ is alkyl having 1 to 12 carbon atoms, alkoxy having 1 to 12 carbon atoms or an alkenyl group having 1 to 12 carbon atoms, in which, in addition, in each case one or two non-adjacent $CH_2$ are each optionally replaced by —O—, —CH=CH—, —CO—, —OCO— or —COO— in which O atoms are not linked directly to one another, and $L^2$ is H or F.

25. A compound according to claim 24, wherein $R^1$ is alkyl having 1 to 12 carbon atoms or alkoxy having 1 to 12 carbon atoms.

26. A medium according to claim 1, wherein said medium has a clearing point above 90° C.

27. A medium according to claim 1, wherein said medium further comprises one or more compounds selected from formulae XIII to XVI:

XIII $R^0$—⬡—⬡—⬡—$X^0$

XIV $R^0$—⬡—⬡—$CH_2CH_2$—⬡($Y^1$)—$X^0$

XV $R^0$—⬡—$CH_2CH_2$—⬡—⬡—$X^0$

XVI $R^0$—⬡—⬡—$C_2H_4$—⬡—$X^0$ (with F substituent)

wherein
  $R^0$ is n-alkyl, oxaalkyl, fluoroalkyl or alkenyl, each having up to 7 carbon atoms,
  $X^0$ is F, Cl, or halogenated alkyl, halogenated alkenyl or halogenated alkoxy, each having up to 6 carbon atoms, and
  the 1,4-phenylene rings are in each case unsubstituted or substituted by CN, F or Cl.

28. A liquid-crystalline medium comprising polar compounds of positive dielectric anisotropy, said medium comprising:
  one or more compounds of formula I

I $R^1$—$(A^1—Z^1)_n$—$A^2$—$Z^2$—⬡($L^1$, $L^2$)—NCS wherein
  $R^1$ is alkyl having 1 to 12 carbon atoms, alkoxy having 1 to 12 carbon atoms or an alkenyl group having 1 to 12 carbon atoms, in which, in addition, in each case one or two non-adjacent $CH_2$ are each optionally replaced by —O—, —CH=CH—, —CO—, —OCO— or —COO— in which O atoms are not linked directly to one another, $Z^1$ and $Z^2$ are each, independently of one another, —O—, —COO—, —OCO—, —$CH_2CH_2$—, —CH=CH—, —$CF_2CF_2$—, $CF_2O$—, —$OCF_2$—, —$CH_2O$—, —$OCH_2$—, —CF=CF— or a single bond, $A^1$ and $A^2$ are each, independently of one another,

[cyclohexylene], [phenylene],

[fluorophenylene], [difluorophenylene],

[dioxane] or [pyrimidine], $A^2$, if n is 1, can also be

[bicyclobutane/spiro structure], n is 0 or 1, and
$L^1$ and $L^2$ are each, independently of one another, H or F;
one or more compounds of formula IV,

IV $R^0$—[⬡H]$_r$—⬡($Y^1$, $Y^2$)—⬡($Y^1$, $Y^2$)—$X^0$ wherein
  $R^0$ is n-alkyl, oxaalkyl, fluoroalkyl or alkenyl, each having up to 9 carbon atoms and
  $X^0$ is F, Cl, or halogenated alkyl, halogenated alkenyl or halogenated alkoxy each having up to 6 carbon atoms
  $Y^1$ and $Y^2$ are each, independently of one another, H or F, and
  r is 0 or 1; and
one or more compounds of formula XII

XII $R^0$—⬡—⬡—⬡($Y^1$)—⬡($Y^2$)—⬡—$X^0$ wherein $R^0$, $X^0$, $Y^1$ and $Y^2$ have the meanings defined in formula IV.

29. A liquid-crystalline medium comprising polar compounds of positive dielectric anisotropy, said medium comprising one or more compounds selected from the following formulae:

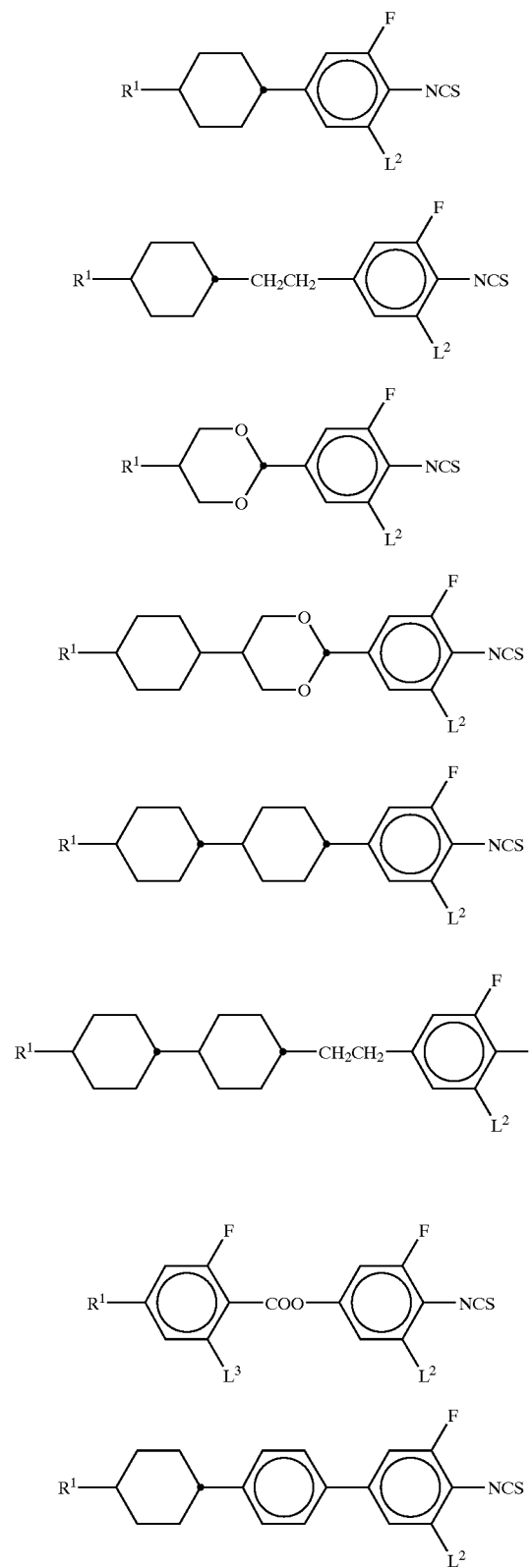
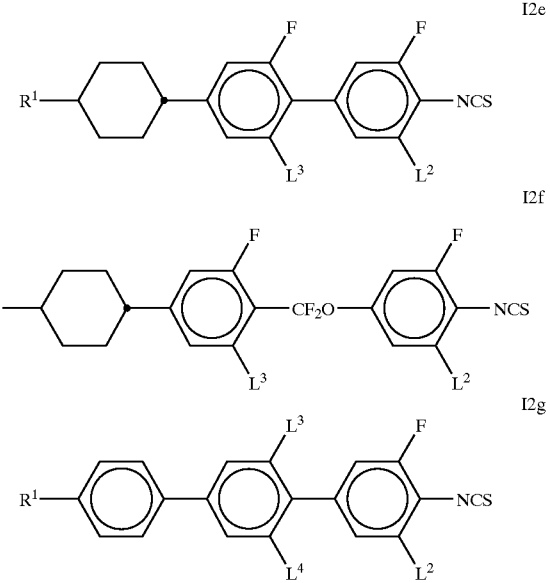

wherein $L^2$, $L^3$ and $L^4$ are each, independently of one another, H or F, and $R^1$ is alkyl having 1 to 12 carbon atoms, alkoxy having 1 to 12 carbon atoms or an alkenyl group having 1 to 12 carbon atoms, in which, in addition, in each case one or two non-adjacent $CH_2$ are each optionally replaced by —O—, —CH=CH—, —CO—, —OCO— or —COO— in which O atoms are not linked directly to one another, wherein said medium has a TN threshold voltage below 1.6 V.

30. A liquid-crystalline medium comprising polar compounds of positive dielectric anisotropy, said medium comprising one or more compounds selected from the following formulae:

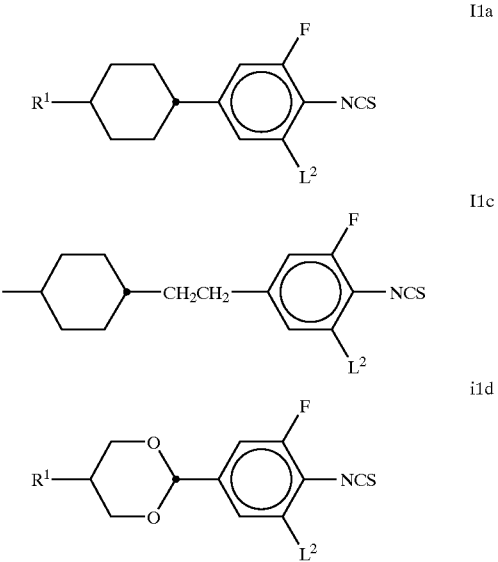

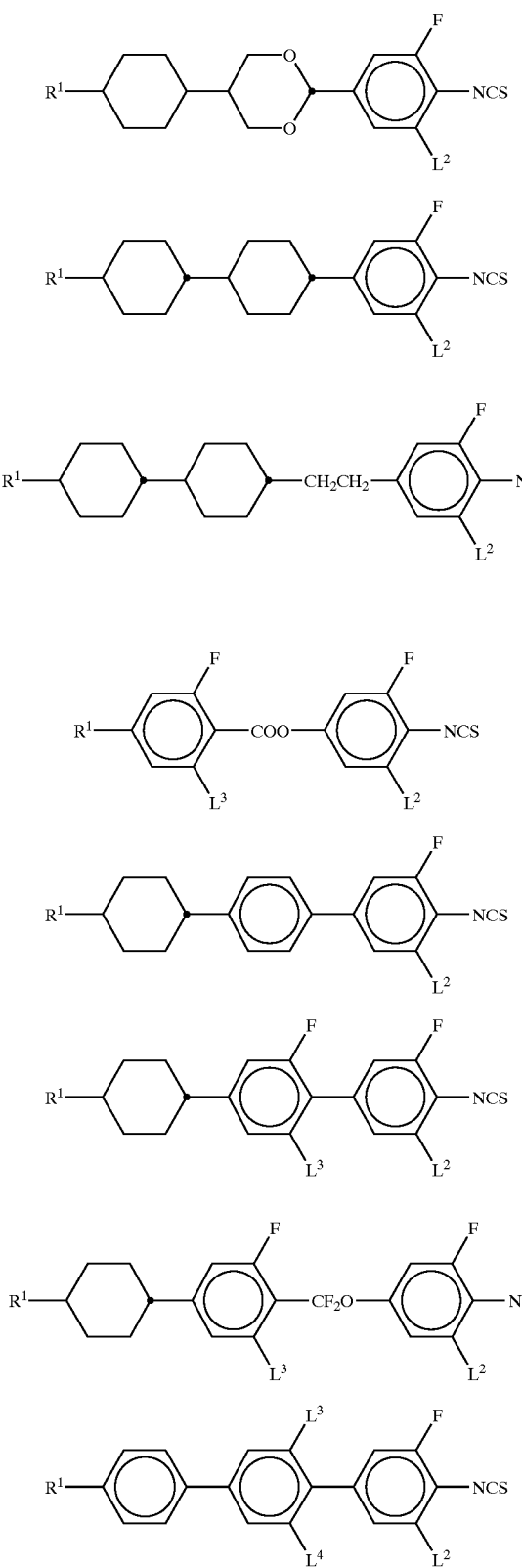

wherein

L², L³ and L⁴ are each, independently of one another, H or F.

R¹ is alkyl having 1 to 12 carbon atoms, alkoxy having 1 to 12 carbon atoms or an alkenyl group having 1 to 12 carbon atoms, in which, in addition, in each case one or two non-adjacent CH₂ are each optionally replaced by —O—, —CH=CH—, —CO—, —OCO— or —COO— in which O atoms are not linked directly to one another, wherein said medium has a clearing point of 85° C. or higher.

31. A liquid-crystalline medium comprising polar compounds of positive dielectric anisotropy, said medium comprising one or more compounds of formula I

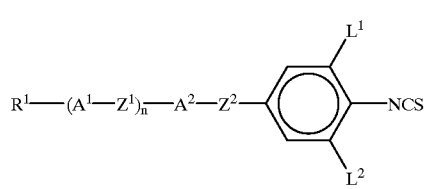

wherein

R¹ is alkyl having 1 to 12 carbon atoms, alkoxy having 1 to 12 carbon atoms or an alkenyl group having I to 12 carbon atoms, in which, in addition, in each case one or two non-adjacent CH₂ are each optionally replaced by —O—, —CH=CH—, —CO—, —OCO— or —COO— in which 0 atoms are not linked directly to one another, Z¹ and Z are each, independently of one another, —O—, —COO—, —OCO—, —CH₂CH₂—, —CH=CH—, —CF₂CF₂—, CF₂O—, —OCF₂—, —CH₂O—, —OCH₂—, —CF=CF— or a single bond, A¹ and A² are each, independently of one another,

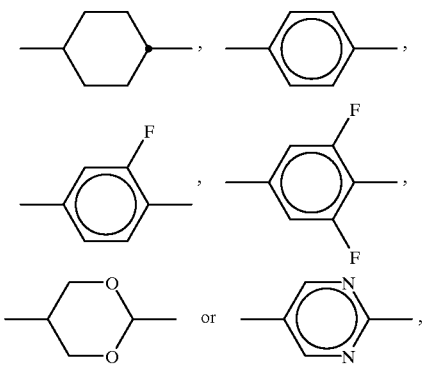

A², if n is 1, can also be

n is 0 or 1, and

L¹ and L² are each, independently of one another, H or F, wherein said medium has a TN threshold voltage below 1.6 V, and wherein said medium further comprises one or more compounds selected from formulae XIII to XVI:

XIII
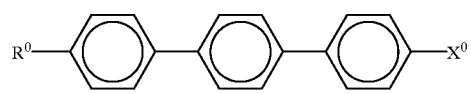
XIV
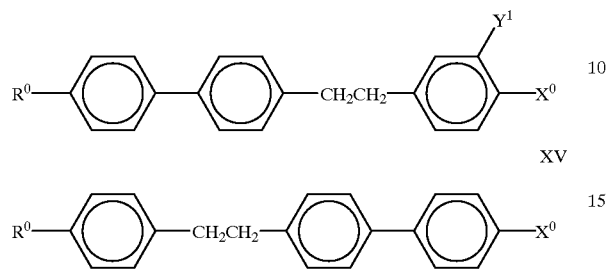
XV
XVI
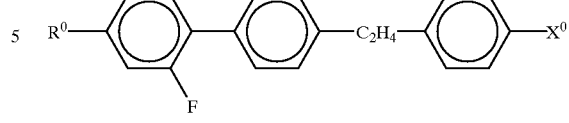
wherein
$R^0$ is n-alkyl, oxaalkyl, fluoroalkyl or alkenyl, each having up to 7 carbon atoms,
$X^0$ is F, Cl, or halogenated alkyl, halogenated alkenyl or halogenated alkoxy, each having up to 6 carbon atoms, and the 1,4-phenylene rings are in each case unsubstituted or substituted by CN, F or Cl.
* * * * *

UNITED STATES PATENT AND TRADEMARK OFFICE
CERTIFICATE OF CORRECTION

PATENT NO.     : 6,716,491 B2
DATED          : April 6, 2004
INVENTOR(S)    : Kazuaki Tarumi et al.

It is certified that error appears in the above-identified patent and that said Letters Patent is hereby corrected as shown below:

Column 48,
Line 32, reads "Zare" should read -- $Z^2$ are --

Signed and Sealed this

Sixteenth Day of November, 2004

JON W. DUDAS
*Director of the United States Patent and Trademark Office*